(12) United States Patent  
Svy et al.

(10) Patent No.: US 7,333,050 B2
(45) Date of Patent: Feb. 19, 2008

(54) RADIO FREQUENCY SIGNATURE AUGMENTATION SYSTEM

(75) Inventors: Kosal Svy, Covington, WA (US); George A. Eastman, Renton, WA (US); James D. Lee, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 11/070,690

(22) Filed: Mar. 1, 2005

(65) Prior Publication Data

US 2008/0018525 A1    Jan. 24, 2008

(51) Int. Cl.
G01S 7/40 (2006.01)
(52) U.S. Cl. ......................... 342/169; 342/172
(58) Field of Classification Search ................. 342/169
See application file for complete search history.

(56) References Cited

U.S. PATENT DOCUMENTS

| | | | | |
|---|---|---|---|---|
| 3,090,955 | A | * | 5/1963 | Hubka et al. ............... 342/171 |
| 3,760,418 | A | * | 9/1973 | Cash et al. .................... 342/6 |
| 4,560,987 | A | * | 12/1985 | Dochow et al. ............ 342/171 |
| 4,613,863 | A | * | 9/1986 | Mitchell ..................... 342/172 |
| 5,351,054 | A | * | 9/1994 | Fredericks et al. ......... 342/172 |
| 5,892,479 | A | * | 4/1999 | Mills et al. ................. 342/172 |
| 6,067,041 | A | | 5/2000 | Kaiser et al. |
| 6,346,909 | B1 | * | 2/2002 | Johnson et al. ............. 342/169 |
| 6,492,939 | B1 | * | 12/2002 | Fredericks et al. ......... 342/172 |

FOREIGN PATENT DOCUMENTS

GB    2134740 A    8/1984

OTHER PUBLICATIONS

Title page and Distribution Statement for Document No. D800-12881-1 "Communication Security System Description For The Drone Radio Frequency (RF) Electronic Enhancement Mechanism Program", prepared under U.S. Government Contract No. F08626-98-C-0163 (A004) Jan. 4, 1996.

* cited by examiner

Primary Examiner—Thomas H. Tarcza
Assistant Examiner—Matthew M Barker
(74) Attorney, Agent, or Firm—Robert R. Richardson, P.S.

(57) ABSTRACT

Systems and methods are provided for simulating a target platform. An incoming radar signal is transmitted from a radar source and is received at a first platform. Time of the received radar signal is modulated to generate first and second range extent signals. The first range extent signal is vector modulated, and the second range extent signal is divided into a plurality of divided second range extent signals. A first of the plurality of divided second range extent signals is phase modulated. A second of the plurality of divided second range extent signals is amplitude modulated. The modulated signals are transmitted from the first platform.

20 Claims, 34 Drawing Sheets

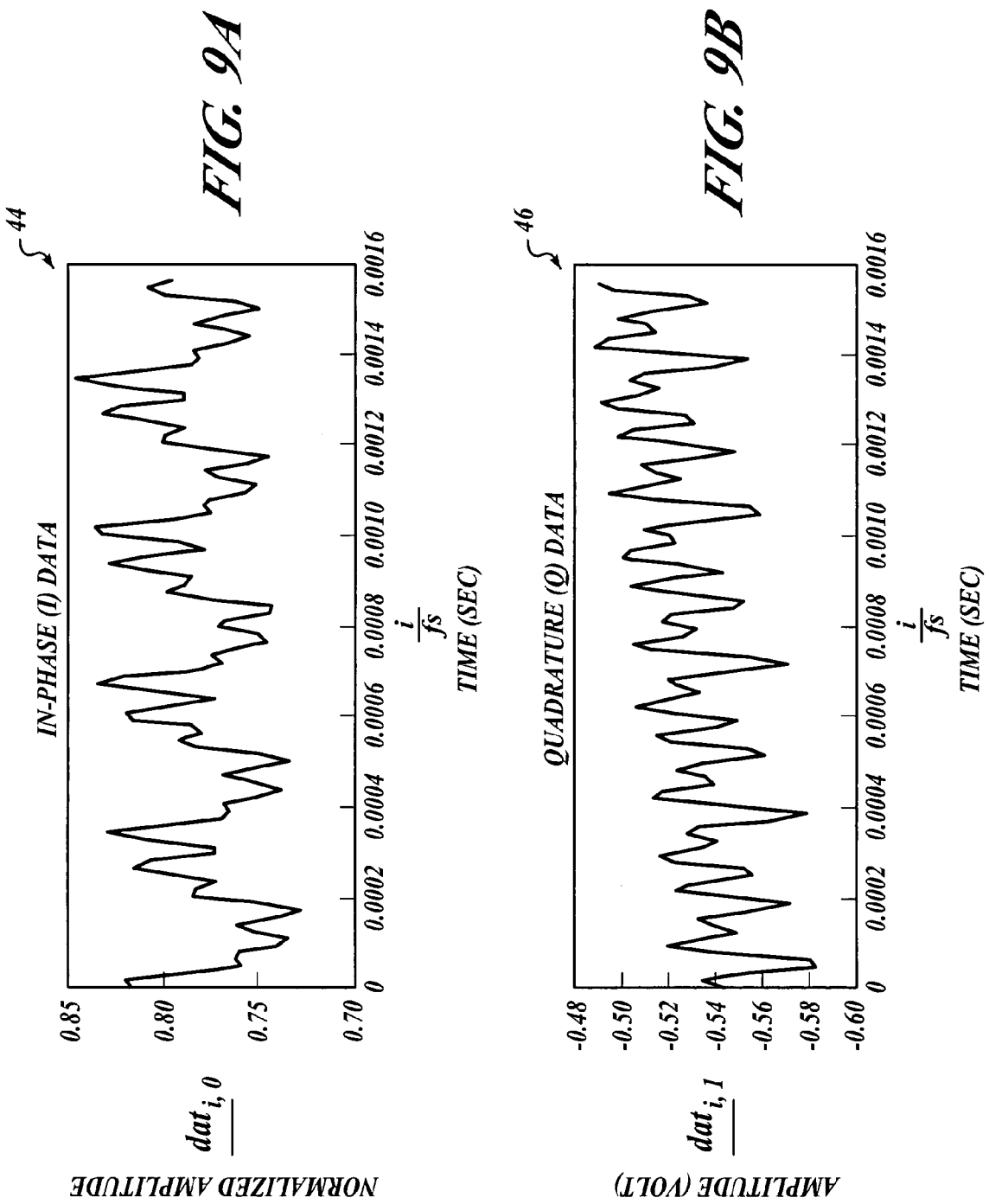

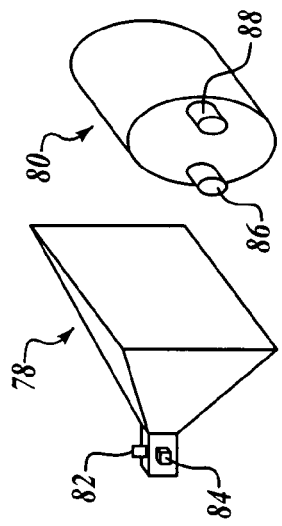
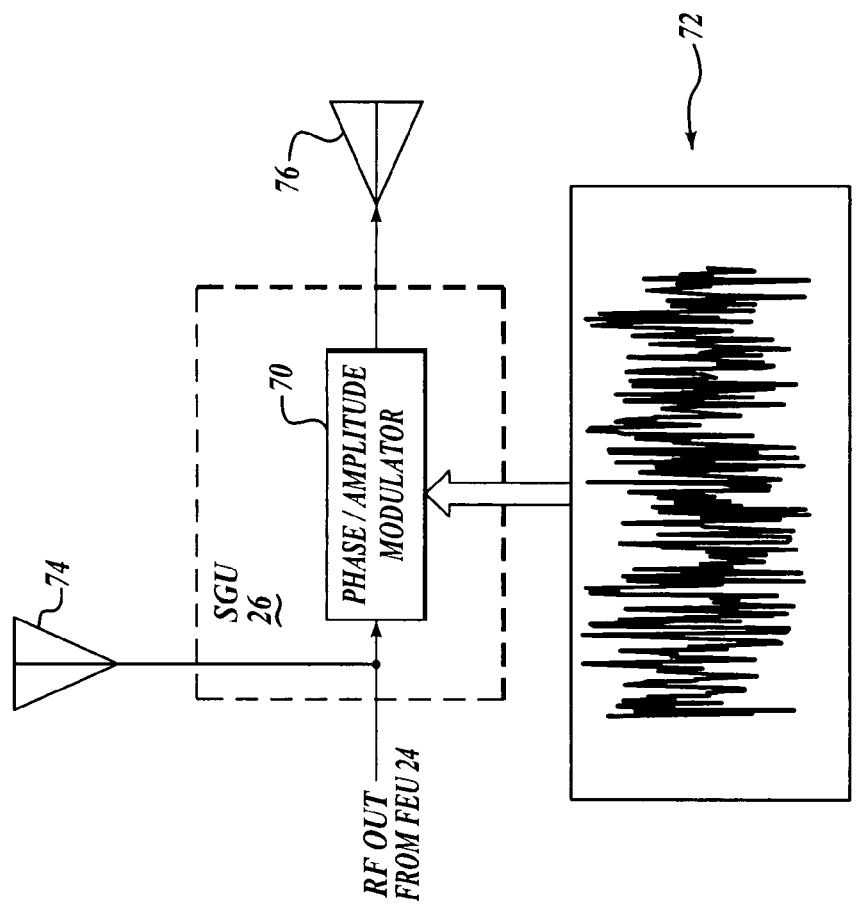
FIG. 13B
FIG. 13A

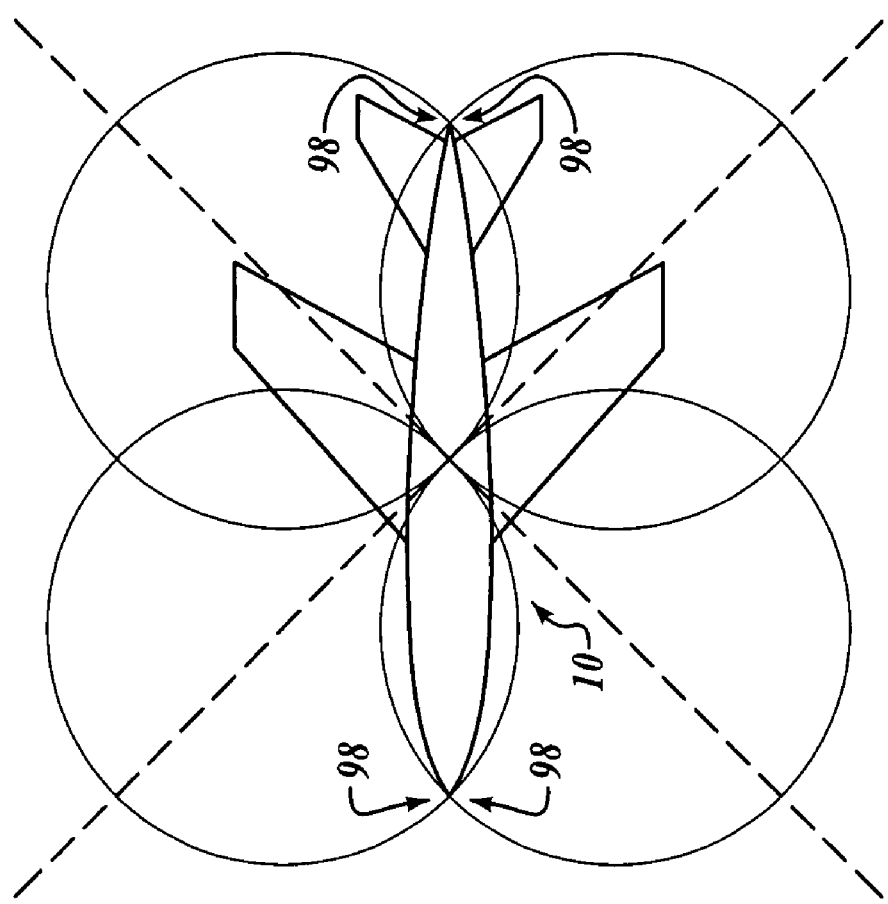

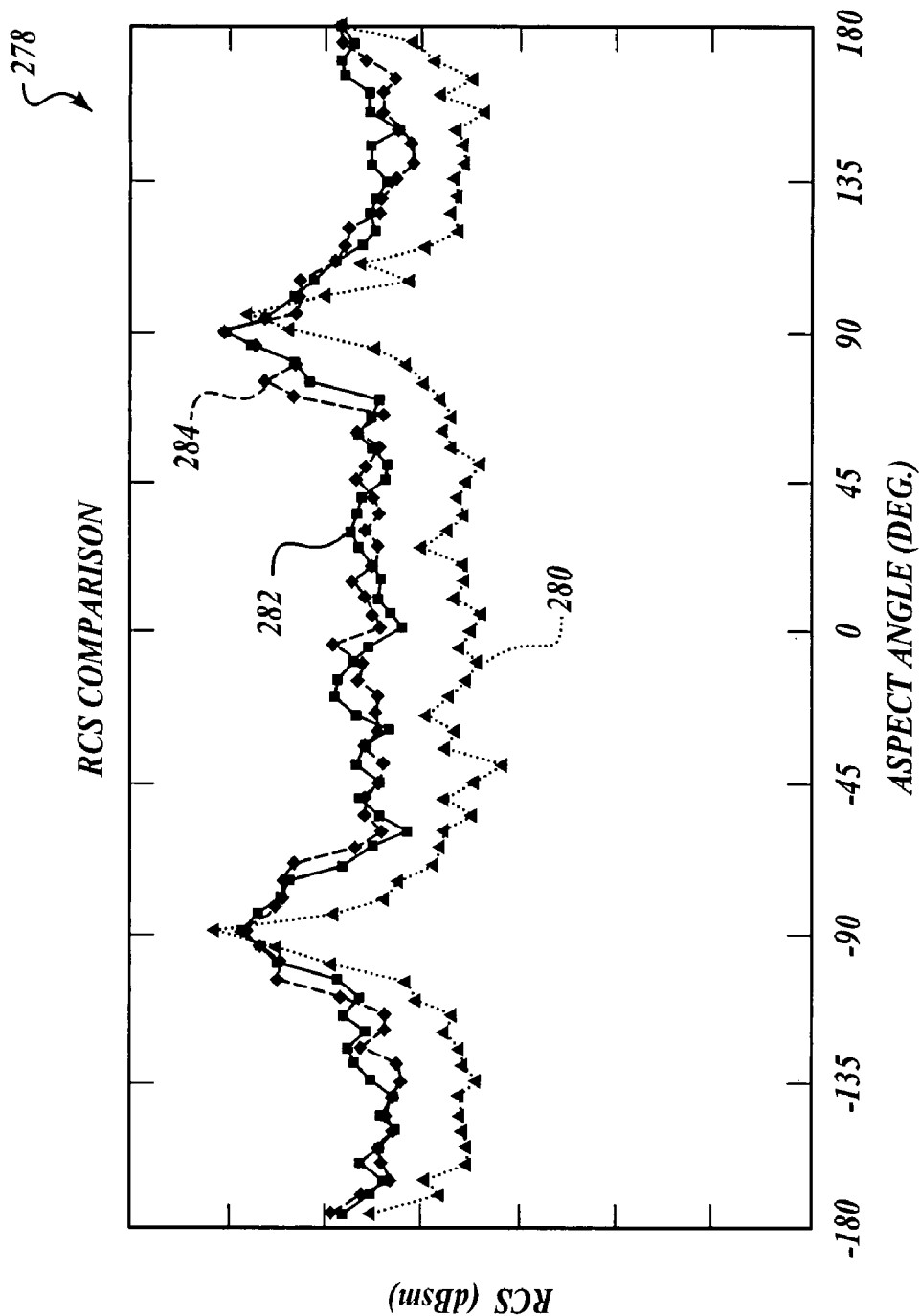

MEASURED SPECTRUM

PREDICTED SPECTRUM

RADIO FREQUENCY SIGNATURE AUGMENTATION SYSTEM

FIELD OF THE INVENTION

The present invention relates to target signal simulation and, more specifically, to radio frequency signature augmentation.

BACKGROUND OF THE INVENTION

Advances in weapon systems technology have enabled some weapon systems to discriminate targets based on target signatures. As a result, evaluating and/or deceiving these types of sophisticated weapon systems have become increasingly difficult.

Various methods are currently used to evaluate weapon systems. These evaluation methods include computer modeling, hardware-in-the-loop (HIL), and flight testing. Currently, the evaluation method that is chosen for use depends on the development stage of the weapon systems to be evaluated. However, only during flight tests are a missile's kinematics, target tracking, and counter electronic countermeasures (counter ECM) performance capabilities fully exercised and evaluated.

A lack of targets available for weapon systems evaluation exists because of practicality and cost constraints. For example, no bomber aircraft are available in current U.S. inventories for use as targets in evaluating employment of modern weapon systems against bomber aircraft.

This lack of target assets forces weapon evaluators to use similarly-sized surplus assets and/or subscale drones that employ means for enhancing their signatures to levels representative of actual targets. For example, subscale drones currently are used for over 90% of missile evaluation flight tests. However, because of relatively high acquisition and maintenance costs, a full-size target, such as a QF-4, is available for only a small percentage of flight tests. Even when such a target is used, its signature remains that of the actual airframe used—and not that of an actual threat, such as a Backfire bomber or a MIG-29 interceptor or a Mirage fighter or the like. Moreover, because of its large and complex structure and span, a bomber offers unique challenges for missile tracking algorithms.

One approach to overcoming such a lack of target assets might be to mechanically modify available assets like subscale drones. However, relatively small physical characteristics of available assets do not provide target signature levels and fidelity that are representative of full-sized fighter and bomber targets. Lowered signal strength and fidelity restrict a missile's ability to engage such a target at long ranges, thereby lessening severity of performance-degrading effects on the missile that are typically associated with the signature of a full-size target at close ranges. Similarly, current decoys lack sufficient signature fidelity, thereby enabling advanced enemy weapon systems to reject the decoys during battlefield engagement.

Currently, long-range engagement deficiencies are addressed by employing passive reflectors, such as a Luneberg lens, or a corner reflector, or a simple active repeater (beacon). While these techniques are acceptable for crew training exercises, they are not suitable for missile evaluation purposes. A passive reflector or a beacon provides a relatively steady-state point source over a specified angular region, thereby artificially enhancing ability of the missile to track the target at long and short distances.

Such steady-state signals do not exhibit complex modulations, that are inherent in the signature of a full-size target, to stress the missile's performance envelope. A complex target, such as a bomber aircraft, introduces various forms of modulation onto an illuminating radar's signal. The type of modulation introduced is aspect dependent. These modulations include radar cross section (RCS), amplitude modulation (scintillation), phase/Doppler modulation (et engine modulation, or JEM), angular modulation (glint), polarization modulation, and time modulation (range noise). Each type of modulation produces undesired effects on the engaging missile. Different missiles employ different techniques and software algorithms to lessen or eliminate negative effects caused by these modulations.

Therefore, it would be desirable to simulate a variety of threat aircraft with a sufficiently high fidelity level for a realistic evaluation of weapon systems.

SUMMARY OF THE INVENTION

Embodiments of the present invention simulate a variety of platforms, such as without limitation threat aircraft, with a sufficiently high fidelity level for a realistic evaluation of weapon systems. As a result, boundaries of missile performance envelopes can be evaluated against different threats with greater accuracy than is achievable with use of subscale platforms such as drones and without the prohibitive and infeasible costs associated with acquisition of full-scale targets such as aircraft. Also, embodiments of the present invention are able to simulate several different targets, including without limitation fixed wing and rotary wing aircraft, thereby providing weapon systems evaluators with increased flexibility over conventional testing methods. The simulated targets may include aircraft such as helicopters, fighter aircraft, bomber aircraft, ballistic missiles, land-based platforms, and maritime platforms such as ships and submarines, as desired. Advantageously, simulation performed by embodiments of the present invention includes emulation as well as augmentation.

Embodiments of the present invention augment the radiofrequency (RF) signature of a host platform, like a subscale air vehicle such as a drone or the like, to simulate the RF signature of a simulated platform, such as a full-sized aircraft or the like, with sufficient fidelity for weapon system testing, evaluation, and training (for target aircraft) and for deception of radar systems (for decoy aircraft). Any one or a combination of modulation techniques, including amplitude modulation, phase modulation, polarization modulation, and range extent modulation, suitably are used to generate an aspect-dependent signature of a desired aircraft. Further, embodiments of the present invention may program, activate/deactivate, and/or vary RF signature facets and parameters. As a result, embodiments of the present invention are able to simulate different target signatures to evaluate boundaries of missile performance envelopes unmatched by conventional techniques.

As such, embodiments of the present invention provide a signal repeater that modulates a signal received from an illuminating radar and sends back to the illuminating radar the modulated signal. Because the present invention may be embodied as a repeater, the modulated signal is sent back to the illuminating radar only when the radar signal has been received from the illuminating radar. Advantageously, this improves realism over signals that are continuously generated and transmitted toward the illuminating radar—regardless of whether the target may have been illuminated by the illuminating radar.

For example, according to embodiments of the present invention, systems and methods are provided for simulating a target platform. An incoming radar signal is transmitted from a radar source and is received at a first platform, such as without limitation a subscale air vehicle. Time of the received radar signal is modulated to generate first and second range extent signals. The first range extent signal is vector modulated, and the second range extent signal is divided into a plurality of divided second range extent signals. A first of the plurality of divided second range extent signals is phase modulated. A second of the plurality of divided second range extent signals is amplitude modulated. The modulated is signals are transmitted from the first platform.

According to an aspect of the present invention, the incoming radar signal is received at an aspect angle, and the first and second range extent signals are modulated with a plurality of stored predetermined coefficients that are based on the aspect angle. Further, simulated signal facets include radar cross section, scintillation, glint, and range extent noise. Scintillation may be simulated via amplitude modulation of the second of the plurality of divided second range extent signals; jet engine modulation may be simulated via vector modulating the first range extent signal in phase and Doppler; radar cross section is simulated by amplifying the vector modulated first range extent signal; and glint may be simulated via phase modulation of the first of the plurality of the divided second range extent signals and is radiated from a plurality of antennas.

BRIEF DESCRIPTION OF THE DRAWINGS

FIGS. 9A and 9B are graphs of exemplary Jet Engine Modulation data;

FIG. 13A illustrates polarization modulation;

FIG. 13B illustrates exemplary dual feed antennas;

FIGS. 17A, 17B, and 17C illustrate receive antenna patterns in azimuth, elevation, and transmit patterns/antenna placement, respectively;

FIGS. 26, 27A and 27B, 28A and 28B, and 29 are graphs of signatures; and

DETAILED DESCRIPTION OF THE INVENTION

Figure 1:
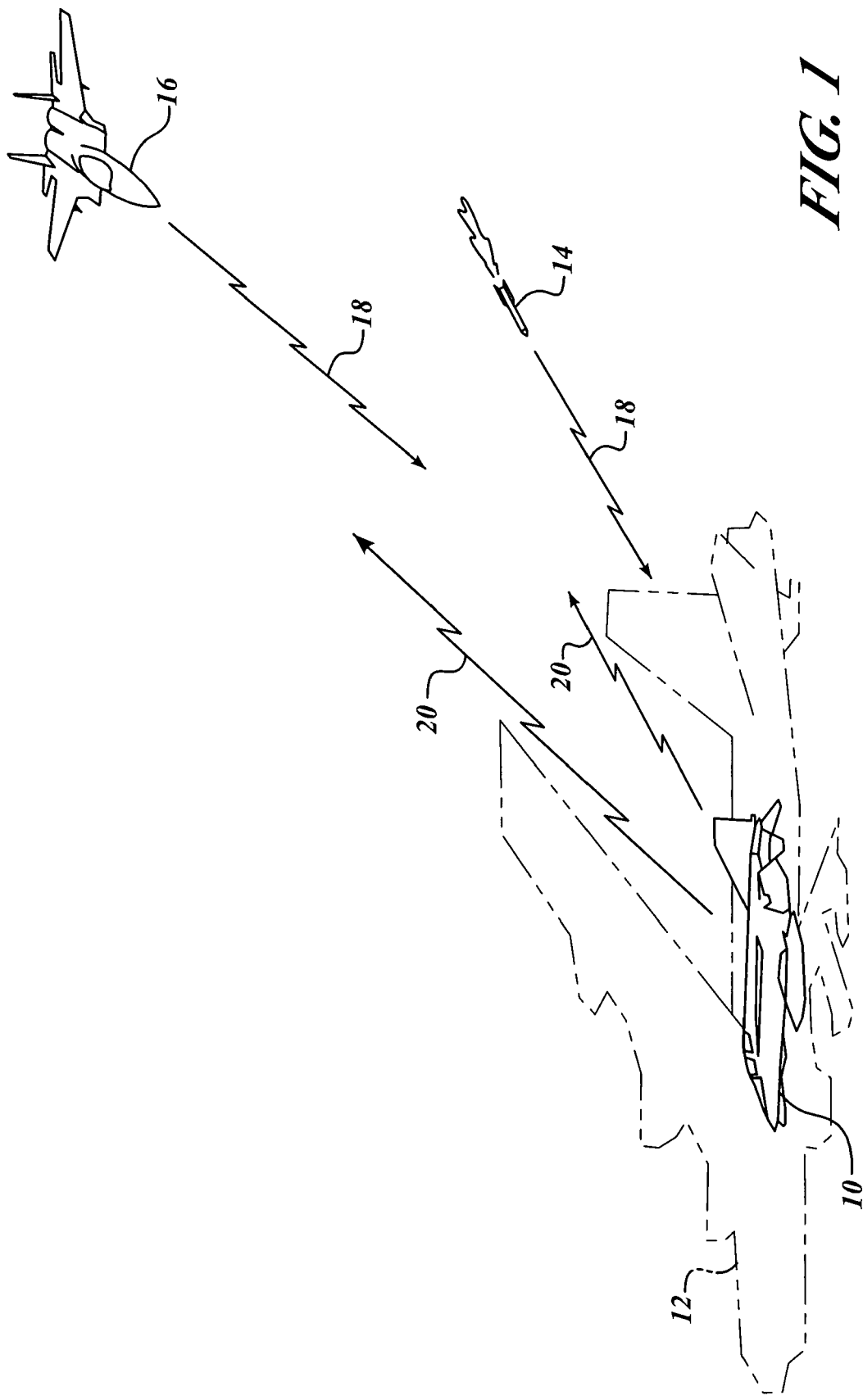
FIG. 1 is an illustration of simulation of a target platform according to an embodiment of the present invention.

Embodiments of the present invention simulate a variety of threat platforms with a sufficiently high fidelity level for a realistic evaluation of weapon systems. Advantageously, simulation performed by embodiments of the present invention includes emulation as well as augmentation. Referring to FIG. 1 and by way of overview, embodiments of the present invention augment the radiofrequency (RF) signature of a host platform 10, such as without limitation a subscale air vehicle like a drone or the like, to simulate the RF signature of a simulated platform 12 such as without limitation a full-sized aircraft (shown in phantom) with sufficient fidelity for testing, evaluation, and training of a weapon system 14 (for target aircraft) and for deception of a radar system 16 (for decoy aircraft). Still by way of overview and given by way of non-limiting example, an incoming radar signal 18 has a polarization and is transmitted from a radar source, such as the weapon system 14 or the radar system 16. The incoming radar signal 18 is received at the host platform 10. At least one of the polarization of the incoming radar signal 18 and range noise is modulated to generate a high-fidelity, modulated radar signal 20 that has a plurality of signal facets that are indicative of a radar reflection from the simulated platform 12. Other signal facets may be modulated as desired for a particular application. The modulated radar signal 20 is transmitted from the host platform 10.

Figure 2:
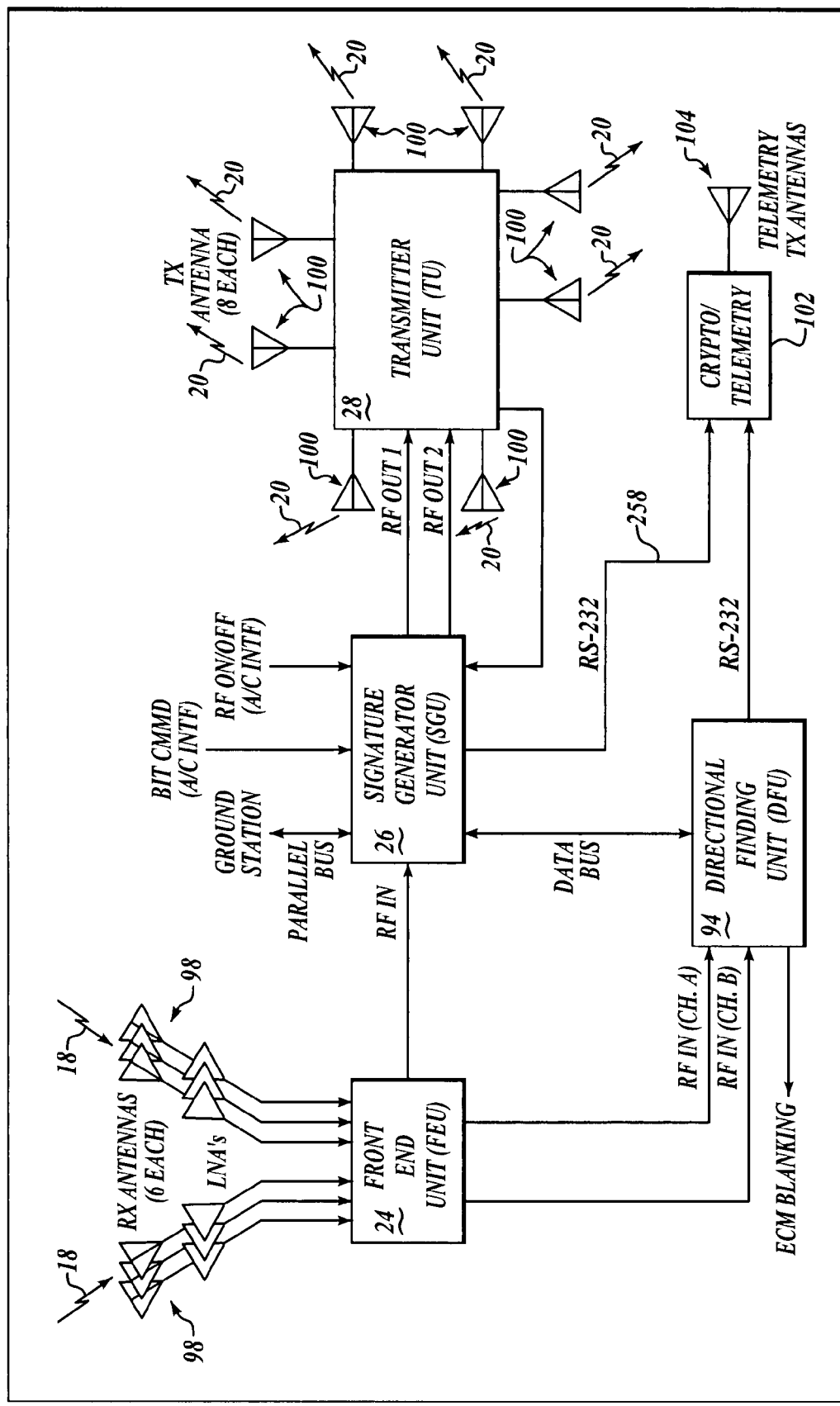
FIG. 2 is a block diagram of an exemplary radio frequency signature augmentation system according to an embodiment of the present invention.

Still by way of overview and referring additionally to FIG. 2, an exemplary radio frequency (RF) signature augmentation system 22 is embodied as a repeater that generates high-fidelity signals that simulate the target platform. A radar receiver 24, also referred to herein as a front end unit (FEU), is configured to receive the incoming radar signal 18. A modulator 26, also referred to herein as a signal generator unit (SGU), receives RF output from the FEU 24 and modulates the incoming radar signal 18 with amplitude, Doppler/phase, polarization, and range extent modulations. As mentioned above, the modulated RF signal has a plurality of signal facets that are indicative of a radar reflection from the simulated target platform. The modulated RF signal is provided from the SGU 26 to a transmitter 28 that transmits the modulated RF signal as the modulated radar signal 20.

First, details regarding signal facets of the target platform will be explained. Then, details of exemplary embodiments will be set forth.

A complex target platform like the simulated platform 12, such as without limitation a bomber aircraft, introduces various forms of modulation onto the illuminating radar signal 18 ranging from Radar Cross Section (RCS), amplitude modulation (scintillation), phase/Doppler modulation (JEM), angular modulation (glint), polarization modulation, and time modulation (range extension and extent noise). Each type of modulation produces undesired effects on the engaging weapon system 14, such as a missile. Different missiles employ different techniques and software algorithms to lessen or eliminate the negative effects caused by these types of modulations. Advantageously, the SGU 26 (FIG. 2) can generate all of these signature facets. Additionally, as a cost reduction measure, embodiments of the present invention can be modularized, if desired, to provide only the signature types that will be required for the weapon system under test. Generation of each of these types of modulations will be discussed below.

RCS is a figure of merit used to describe strength of a radar return from a given target. Embodiments of the present invention use amplifiers and programmable attenuators, described in detail below, to control repeater system gain. The higher the gain, the bigger the RCS of the simulated platform 12.

Figure 3:
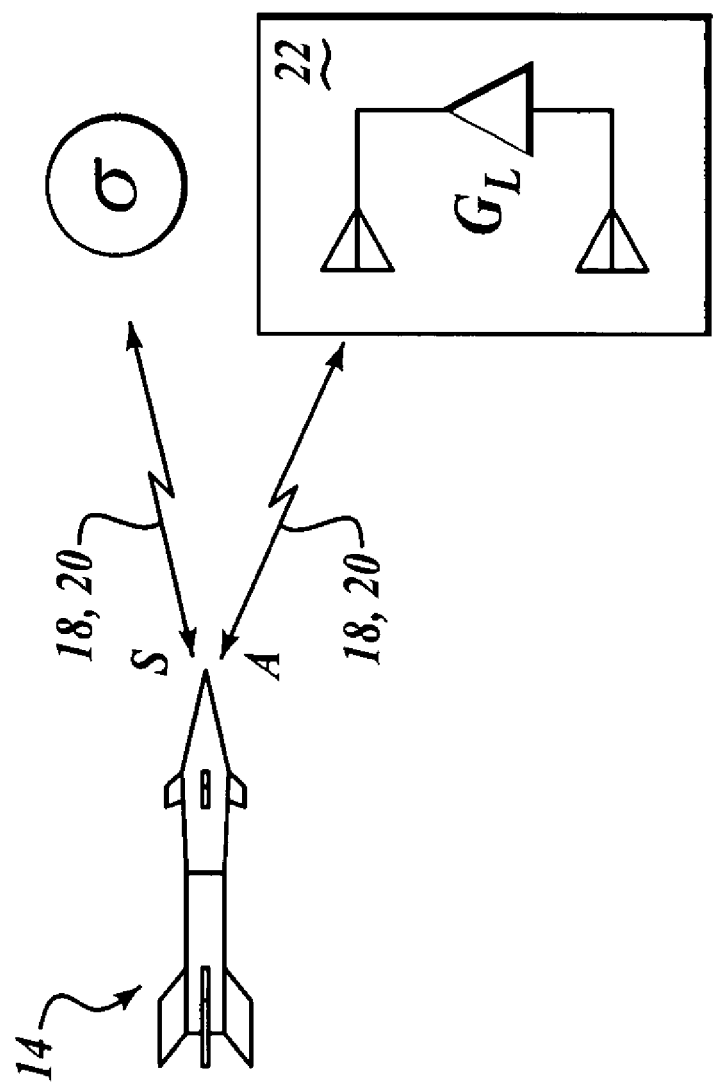
FIG. 3 illustrates a relationship between radar cross section and repeater loop gain.

Referring additionally to FIG. 3, a synthetic target, such as the simulated platform 12, with a given static RCS value σ is generated by employing the system 22 as an electronic repeater configured to provide a loop gain $G_L$ that will amplify the incoming radar signal 18 to a level that represents the desired RCS a for the target platform. The desired loop gain $G_L$ is directly proportional to the desired RCS value a. For example, a loop gain $G_L$ of approximately 51 dB will simulate an RCS σ of 10 m² at 10 GHz and a loop gain of 41 dB will simulate an RCS ca of 1 m² at 10 GHz.

The desired loop gain $G_L$ is determined as follows. A radar signal S received from a target with an RCS σ is given by $$S = \frac{ERP \lambda^2 \sigma}{(4\pi)^3 R^4} \tag{1}$$

where:
S is a radar signal received from a sphere having RCS=σ;
ERP is radar effective radiating power;
λ is radar wavelength;
σ is desired RCS value; and
R is radar range.

A radar signal A received from the system 22 (that is, the modulated radar signal 20) is given by $$A = ERP \cdot \left[\frac{\lambda^2}{(4\pi R)^2}\right] \cdot G_1 \cdot \left[\frac{\lambda^2}{(4\pi R)^2}\right] \tag{2}$$

where $G_L$ is the loop gain of the system 22.
Setting A=S, that is setting Equation 1=Equation 2, $$\frac{ERP\lambda^2\sigma}{(4\pi)^3 R^4} = ERP \cdot \left[\frac{\lambda^2}{(4\pi R)^2}\right] \cdot G_1 \cdot \left[\frac{\lambda^2}{(4\pi R)^2}\right] \tag{3}$$

Solving for $G_L$ yields $$G_1 = \frac{4\pi\sigma}{\lambda^2} \tag{4}$$

Figure 4:
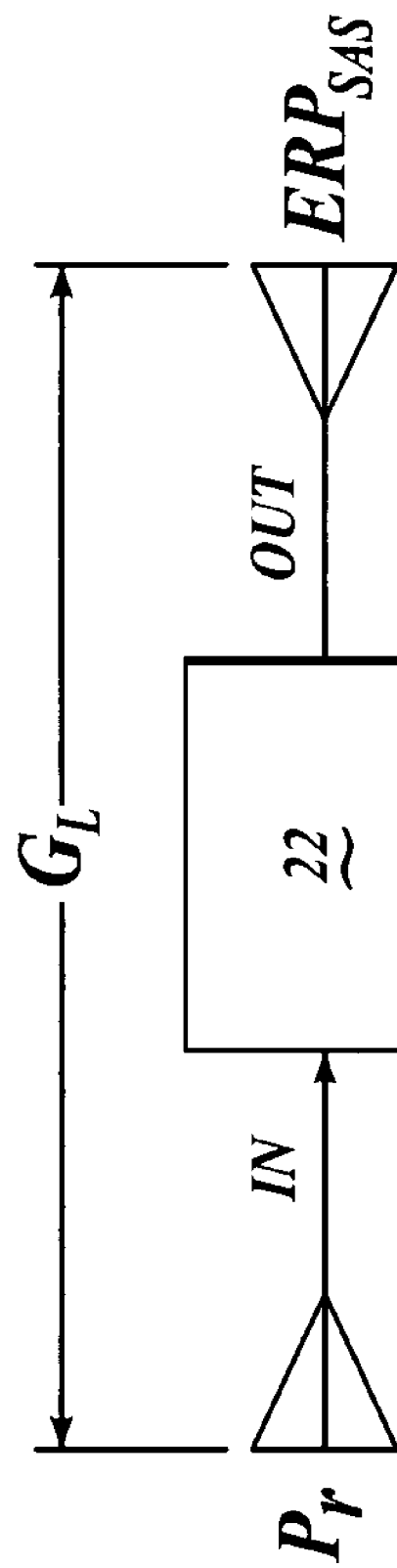
FIG. 4 illustrates an analysis of effective radiated power.

Referring now to FIG. 4, ERP for the system 22 is determined as follows.

$$ERP_{SAS} = P_r G_L \tag{5}$$

where:
$ERP_{SAS}$ is ERP for the system 22; and
$P_r$ is received power.
Substituting for $P_r$, $$ERP_{SAS} = \frac{ERP_r \lambda^2}{(4 \cdot \pi \cdot R)^2} G_L \tag{6}$$

where $ERP_r$ is radar ERP.
Substituting $G_L$ from Equation (4), $$ERP_{SAS} = \left[\frac{ERP_r \lambda^2}{(4 \cdot \pi \cdot R)^2}\right]\left[\frac{4 \cdot \pi \cdot \sigma}{\lambda^2}\right] \tag{7}$$

Equation (7) reduces to $$ERP_{SAS} = \frac{ERP_r}{4 \cdot \pi \cdot R^2}\sigma \tag{8}$$

Solving Equation (8) for saturation range $R_{sat}$ yields $$R_{sat} = \sqrt{\frac{ERP_r \cdot \sigma}{4\pi \cdot ERP_{SAS}}} \tag{9}$$

Figure 5:
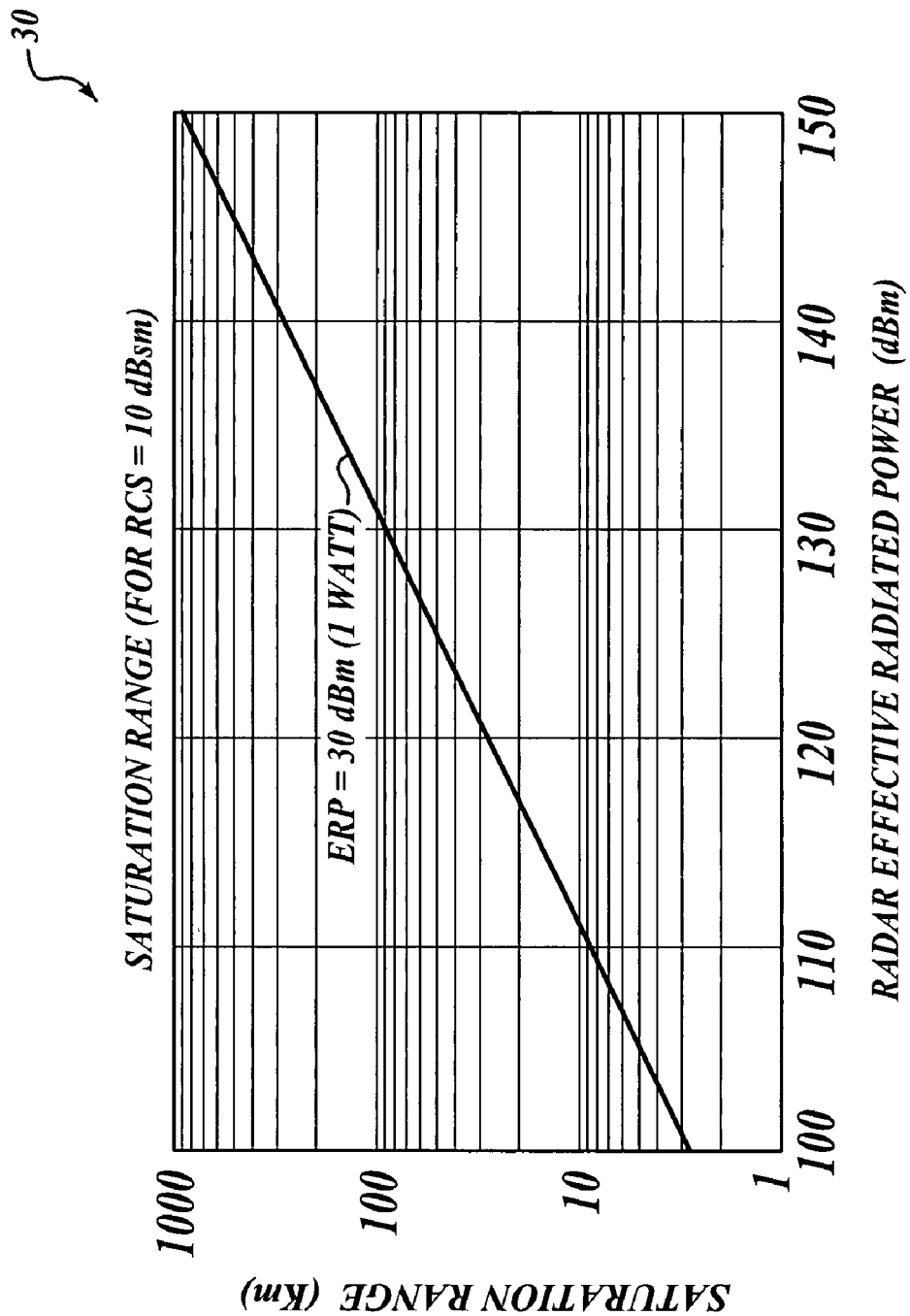
FIGS. 5 and 6 illustrate relationships among radar cross section, effective radiated power, and range.
Figure 6:
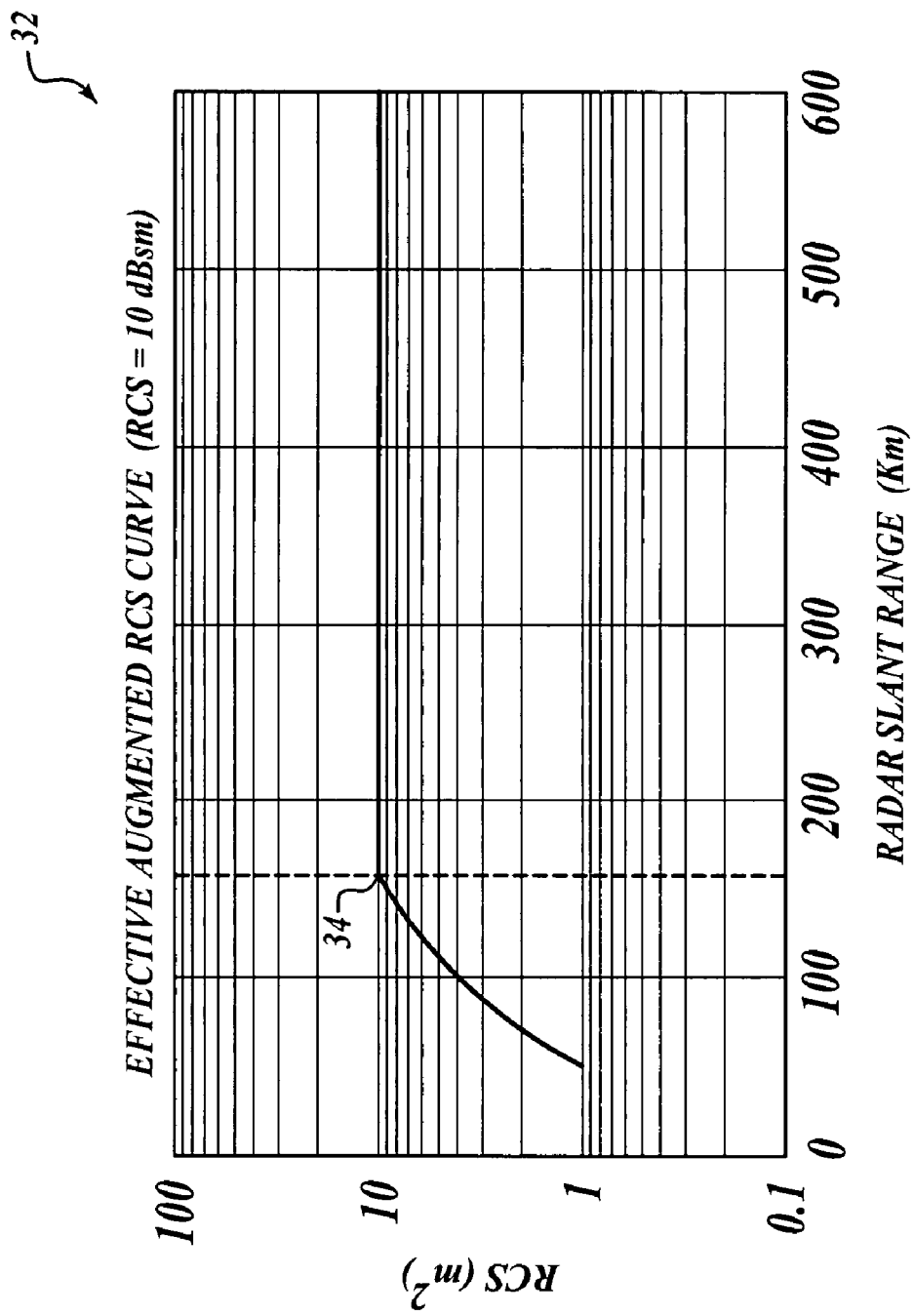

Referring now to FIG. 5, a graph 30 plots $R_{sat}$ in km versus $ERP_r$ in dBm for an RCS σ of 10 dBsm. Referring now to FIG. 6, a graph 32 plots RCS in m² versus radar slant range in km. A saturation point 34 occurs at a radar slant range of approximately 160 km and an RCS of approximately 10 m².

Scintillation is an amplitude fluctuation in the target return induced by body motions and skin vibrations. Scattered signals from different parts of an illuminated target add and subtract at the weapon system 14 or the radar system 16, thereby causing the weapon system 14 or the radar system 16 to see fluctuating signal levels. This amplitude fluctuation is dependent upon size and type of target. Embodiments of the present invention use a programmable attenuator to amplitude modulate a response to simulate scintillation effect. The type of modulation is programmable so any desired target could be simulated.

Figure 7:
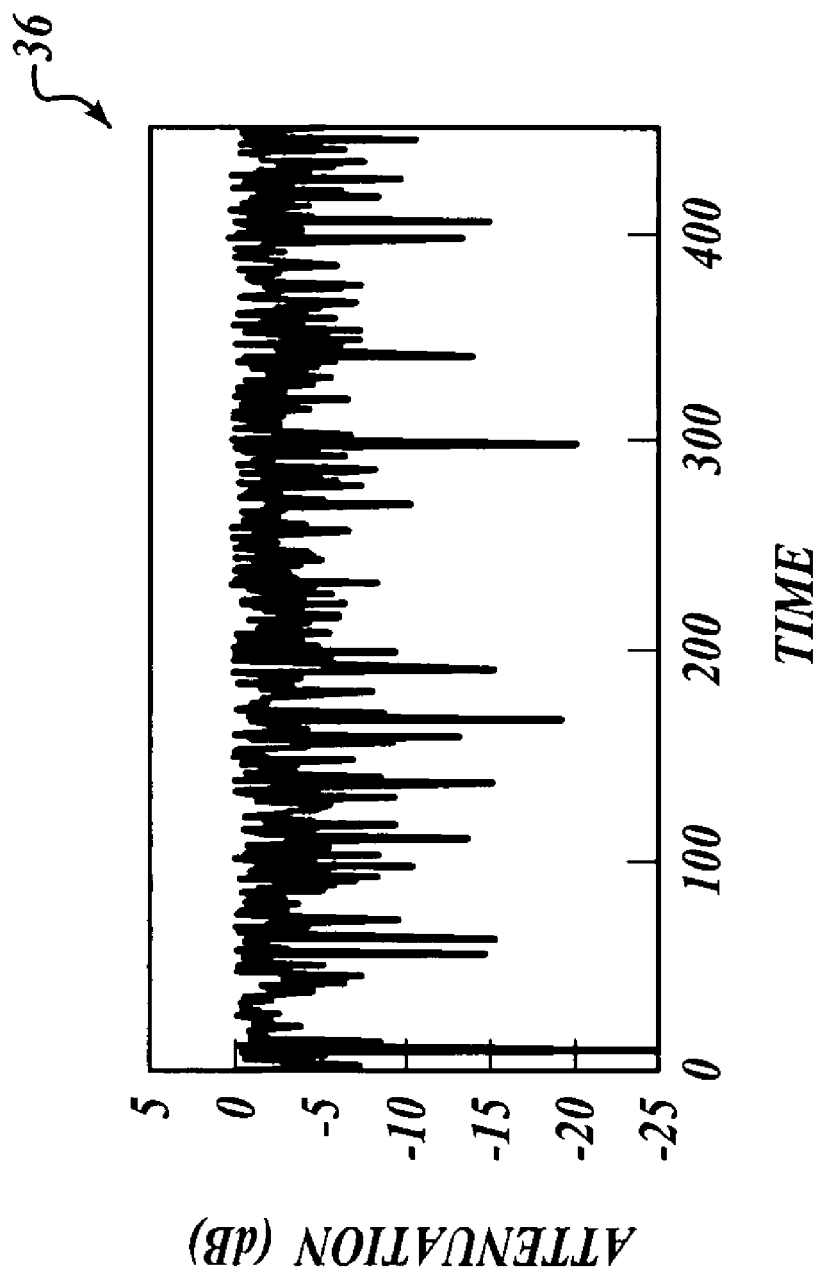
FIG. 7 illustrates scintillation.
Figure 8A:
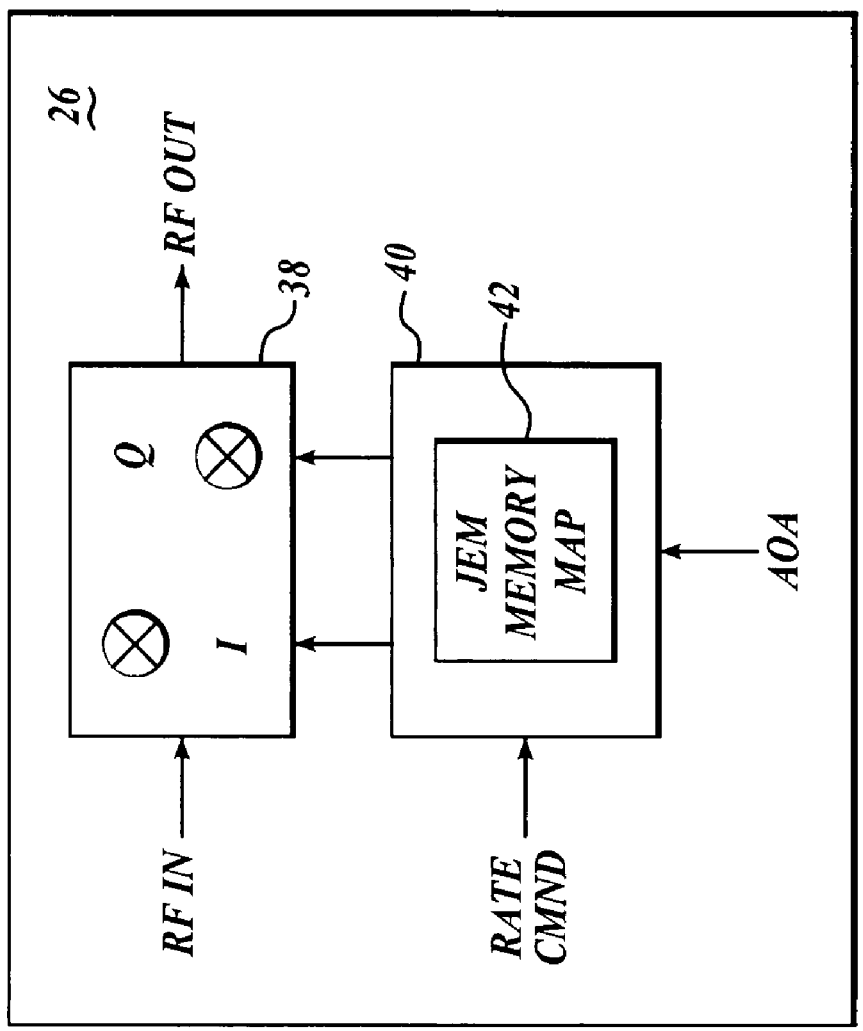
FIGS. 8A and 8B are block diagrams of a Jet Engine Modulation/Propeller Engine Modulation component.
Figure 8B:
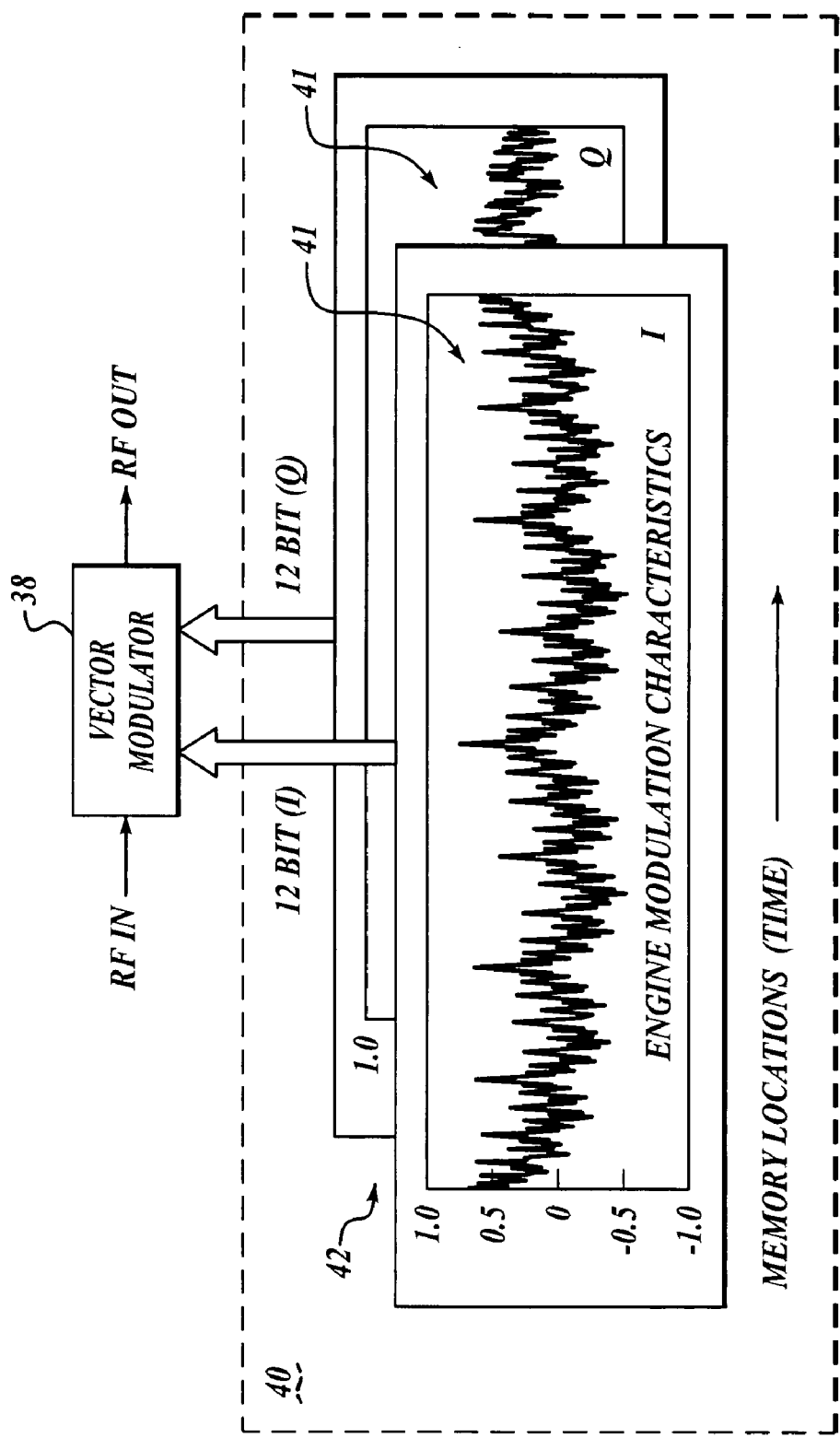

Referring now to FIGS. 1, 2, and 7, a graph 36 plots scintillation characteristics in terms of attenuation in dB versus time (or, alternately, memory locations). Scintillation results in amplitude variation of up to 20 dB at rates ranging from 10 to 500 Hz. Different types of amplitude probability distribution functions can be used to represent scintillation for different types of targets. For example, scintillation associated with a complex target, such a fighter aircraft, can be typically represented using an exponentially distributed amplitude.

In an exemplary embodiment, the system 22 implements scintillation using a variable attenuator (discussed below) within the SGU 26. The variable attenuator is programmable to amplitude modulate the incoming radar signal 18 with a predetermined waveform for the type of target platform to be simulated. In one implementation, the variable attenuator is an 8-bit attenuator that provides attenuation in a range of 0-60 dB. A non-limiting example of an acceptable attenuator is available from General Microwave under part number 3488.

A Doppler signature facet is induced by moving parts on a target, such as jet engine blades that cause jet engine modulation (JEM) or helicopter blades that cause propeller engine modulation (PEM). Embodiments of the present invention use a vector (or I/Q) modulator to modulate both phase and amplitude of the incoming radar signals 18 to accurately replicate any desired target Doppler signatures.

Referring now to FIGS. 1, 2, 8A and 8B, Jet Engine Modulation (JEM) or Propeller Engine Modulation (PEM) describes the Doppler components of the target signature that span a frequency spectrum of tens of KHz about the prominent skin return. This Doppler spectrum is generated when the incoming radar signal 18 is modulated by moving propeller blades or turbo fans of an aircraft. The system 22 accurately simulates JEM and PEM by employing a vector modulator 38 and associated driver circuit 40 within the SGU 26 to alter amplitude and phase of the incoming radar signal 18 amplitude. A non-limiting example of an acceptable vector modulator is a 12 bit in-phase (I) and 12 bit quadrature (Q) modulator available from General Microwave under part number 7128.

The waveforms for programming the vector modulator 38 can be either synthesized or recorded from an actual target. A typical quadrature (I/Q) waveform could be a waveform of any form. For example, one cycle of a sine (Q) wave and one cycle of a cosine (I) wave can simulate one rotating body. As a further example, many combinations of sine and cosine waves could be used to simulate a complex, counter-rotating blade system, such as that found on certain helicopters. Actual or simulated time-domain, complex baseband waveforms 41 are suitably scaled, synthesized, and stored in a memory map 42, such as a look-up table, for various aspect angles AOA. Upon request, the driver circuit 40 can use proper AOA-determined signature map data to continuously sequence waveforms through I and Q ports of the vector modulator 38. By using a synthesized clock source (not shown) for data sequencing with a signal RATE CMND, the desired Doppler spectrum can be precisely replicated.

Figure 9D:
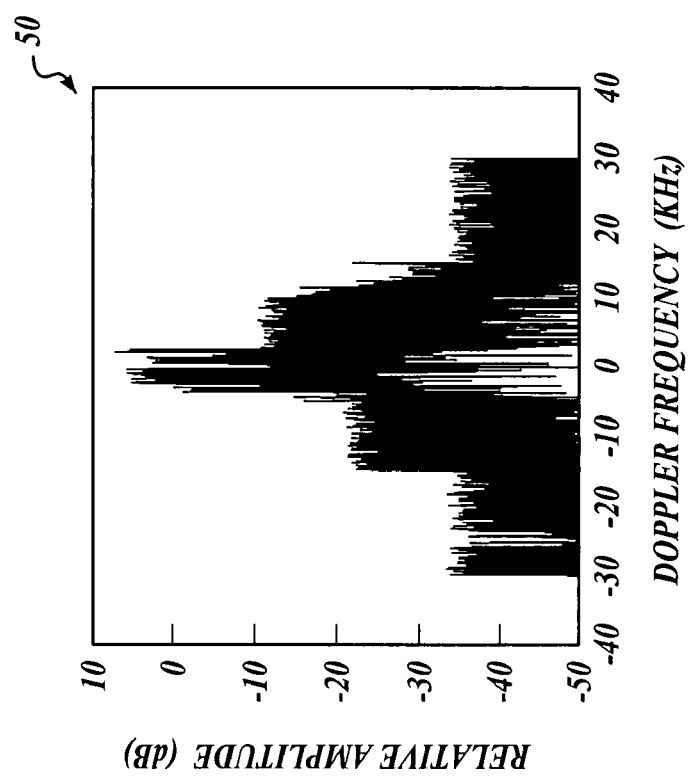
FIGS. 9C and 9D are plots of exemplary Jet Engine Modulation spectra.
Figure 9C:
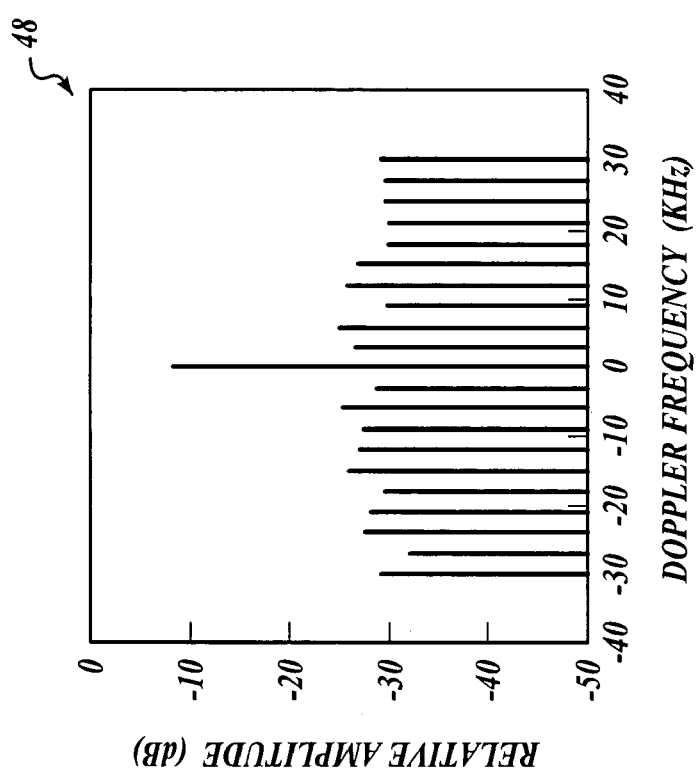

To that end and referring now to FIGS. 9A and 9B, a graph 44 plots normalized amplitude of in-phase (I) data versus time (in seconds) for exemplary Jet Engine Modulation. A graph 46 plots amplitude (in volts) of quadrature (Q) data versus time (in seconds) for exemplary Jet Engine Modulation. Referring now to FIGS. 9C and 9D, a graph 48 plots predicted relative amplitude (in dB) versus Doppler frequency (in KHz) for a simple example of JEM. A graph 50 plots predicted relative amplitude (in dB) versus Doppler frequency (in KHz) for a complex spectrum, such as that presented by a helicopter. Accuracy of the predicted spectra of the graphs 48 and 50 has been verified by laboratory testing and measurement.

Figure 10:
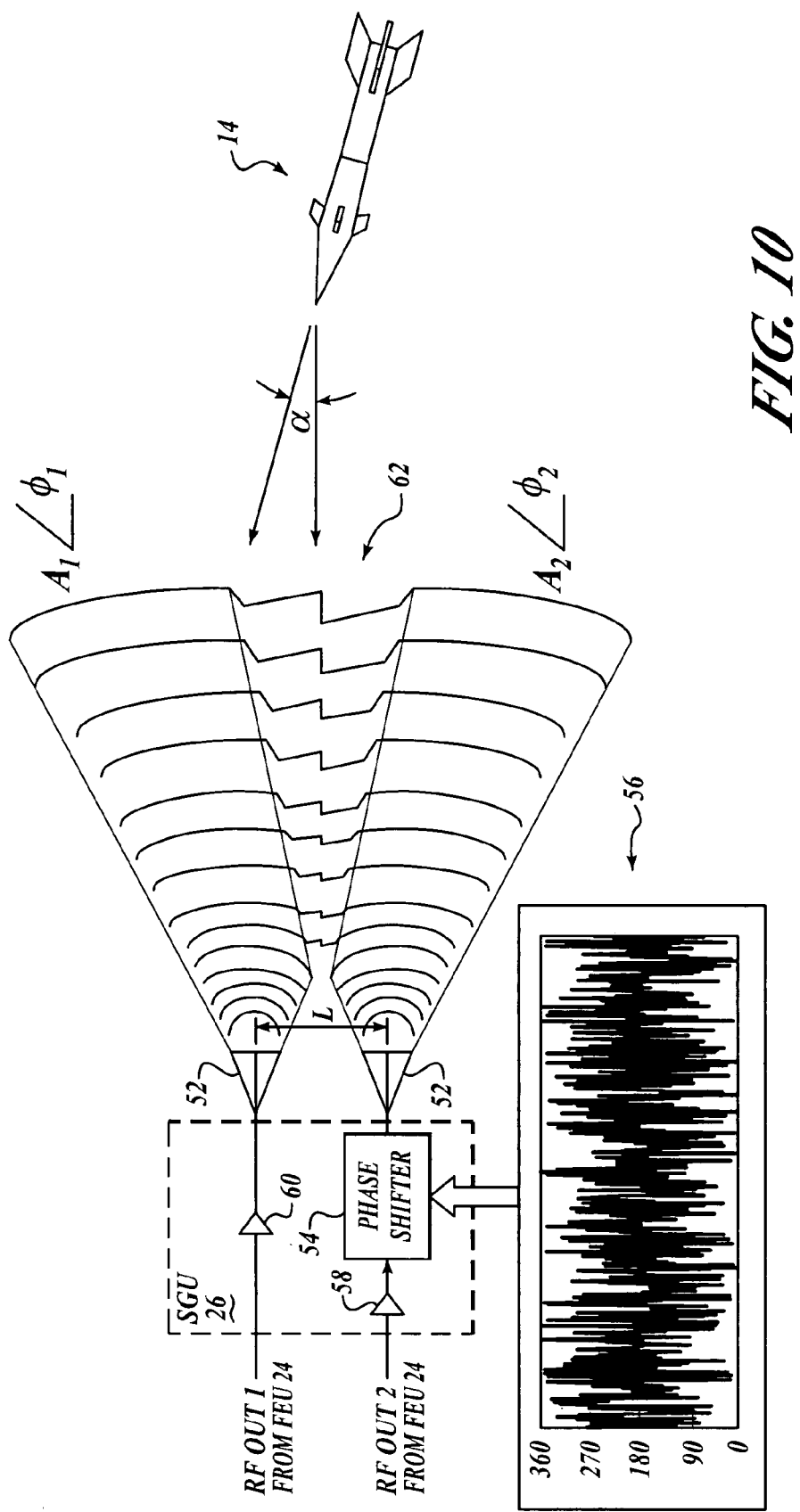
FIG. 10 illustrates generation of glint error effect.

Glint is an angular noise observed by a radar while tracking a relatively large and complex target, like a full-sized aircraft. Glint is mainly due to multiple scatterings from different portions of the large target. Glint can produce within a radar's tracking algorithm a noticeable angular error a between a target's apparent position and the target's actual position. Referring now to FIGS. 1, 2, and 10, embodiments of the present invention simulate glint's effect on radar, such as the weapon system 14 or the radar system 16, by using at least two radiating sources, such as transmit antennas 52, with controlled amplitude and phase. The amount of glint generated is determined by the spatial separation on the host platform 10 between the two sources 52 and their relative amplitude and phase characteristics.

A phase shifter 54 is implemented within the SGU 26. A non-limiting example of an acceptable phase shifter is available from General Microwave under part number 7928. Substantially uniform noise 56 is applied to the phase shifter 54. The phase shifter 54 thus phase modulates one transmitter channel with substantially uniform noise. An amplifier 58 amplifies the RF signal that is applied to the phase shifter 54. An amplifier 60 amplifies the RF signal of the other transmitter channel. The source 52 connected to the amplifier 60 outputs an RF signal having an amplitude $A_1$ with a phase $\Phi_1$. The source 52 connected to the phase shifter 54 outputs an RF signal having an amplitude $A_2$ with a phase $\Phi_2$. The glint error is manifested in a glint region 62.

The relationship between amplitude and phase parameters $A_1$, $A_2$, $\Phi_1$, and $\Phi_2$ and the glint error is described below:

$$ERROR_t = 0.5 \cdot L \cdot \left[ \frac{1 - A^2}{1 + A^2 + 2A \cdot \cos(\phi_1)} \right] \quad (10)$$

where:
$A = A_1/A_2$;
$\phi = \Phi_1 - \Phi_2$; and
L is spatial separation between the sources 52.

Glint effect is maximized when the ratio A approaches one (1). Therefore, it is desirable to maintain the amplitudes $A_1$ and $A_2$ matched as closely as possible to maximize the glint effect. Glint effect is also maximized when the phase difference $\phi$ approaches 180 degrees. As the spatial separation L increases, the glint effect becomes greater. Therefore, it is desirable to maximize the spatial separation L between the sources 52 to maximize glint effect.

Figure 11A:
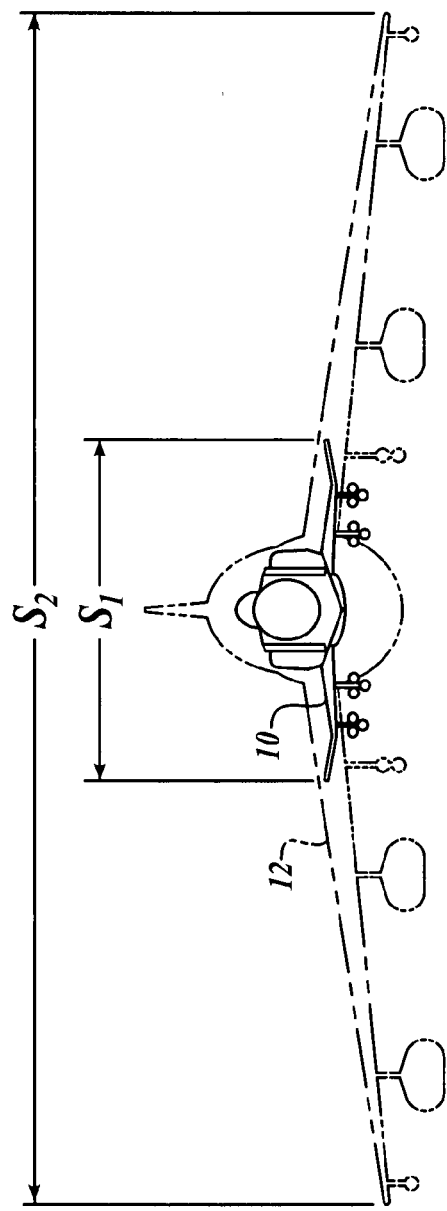
FIGS. 11A and 11B illustrate relationship of glint between a host platform and a simulated target.
Figure 11B:
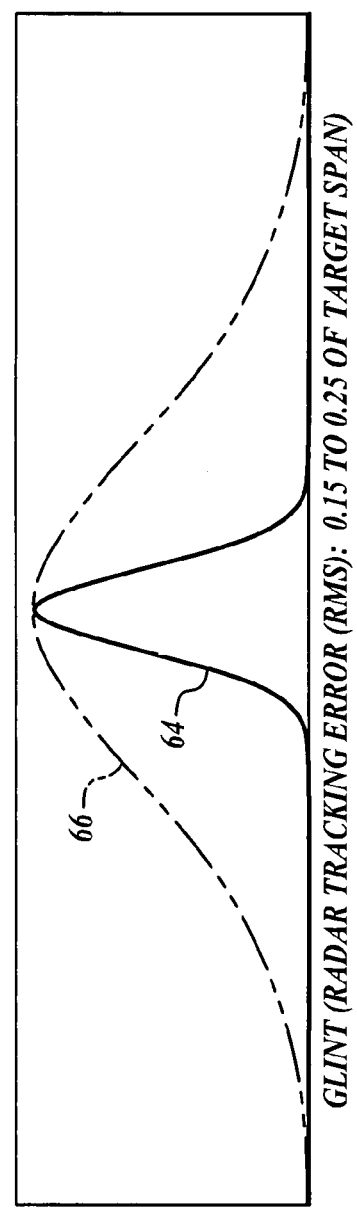

Referring additionally now to FIGS. 11A and 11B, relative size between glint effect of the host platform 10, and glint effect of the simulated platform 12, generated by the system 22 is illustrated. The host platform 10 has a span $S_1$. Given by way of non-limiting example, when the host platform 10 is embodied as a QF-4 drone, the span $S_1$ is around 38 feet or so. The simulated platform 12 has a span $S_2$. Given by way of non-limiting example, when the simulated platform 12 simulates a bomber aircraft such as a B-52 bomber, the span $S_2$ is around 185 feet or so. In FIG. 11B a curve 64 plots probability of occurrences (that is, a statistical distribution) versus glint error (referenced to FIG. 11A) for the host platform 10 in the azimuth axes. A curve 66 plots probability of occurrences (that is, a statistical distribution) versus glint error (referenced to FIG. 11A) for the simulated target, such as the full-sized aircraft 10. The glint effect will cause the tracker to wander around the center of the target. The extent and duration of the track error will exhibit a probability distribution with the shape depicted in FIG. 11B, relative to the size of the targets shown in FIG. 11A.

Figure 12:
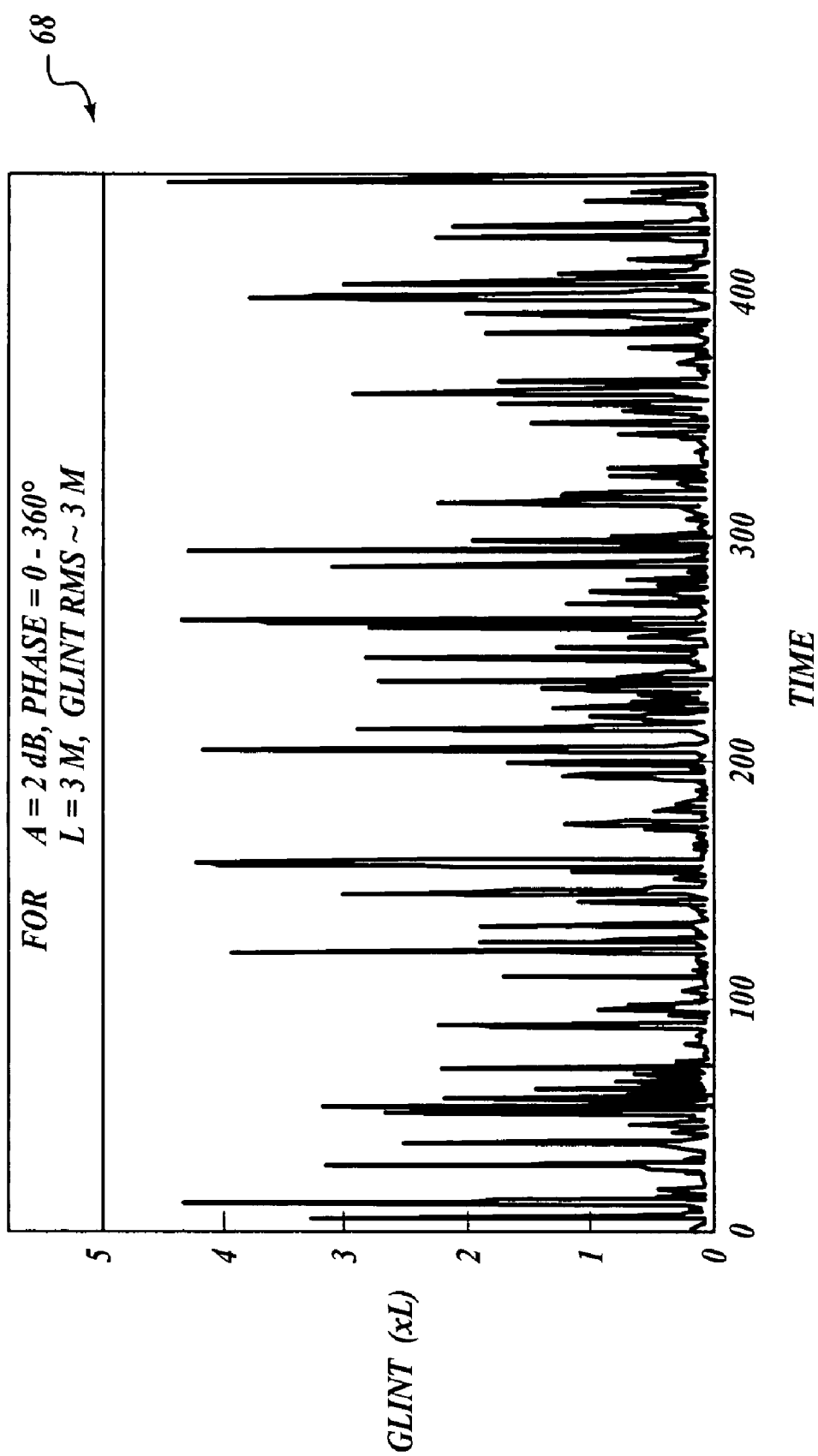
FIG. 12 plots glint versus time.

Referring additionally now to FIG. 12, a curve 68 plots a non-limiting example of simulated target glint generated by the system 22 versus time. In this non-limiting example, the amplitudes $A_1$ and $A_2$ are around 2 dB, the phases $\Phi_1$ and $\Phi_2$ vary between 0 and 360 degrees, the spatial separation S is around 3 meters, and the glint root mean square (RMS) error is approximately 3 meters.

A missile seeker has its own tracking boresight calibrated based on its own antenna polarization. A complex target will scatter both co-polarization (that is, the same polarization as the missile) and cross-polarization (that is, the opposite polarization of the missile). If the cross-polarization signals become dominant, then the missile could miss the target because of boresight error. Embodiments of the present invention use dual polarized transmit antennas, thereby permitting signal strength of the modulated radar signal 20 to provide both co-polarization signals and cross-polarization signals.

Referring now to FIGS. 1, 2, and 13A, the system 22 modulates polarization of the incoming radar signal 18. A target illuminated with a circular polarization radar signal reflects both right-hand circular polarization and left-hand circular polarization. Also, a target illuminated with a linear polarization radar signal reflects VV or HH linear polarization.

Advantageously, the system 22 generates a polarmetric signature of the simulated platform 12. Modulation weighting coefficients vary based upon the target to be simulated. The SGU 26 includes programmable phase/amplitude modulators 70 that receives polarization modulation weighting coefficients 72 used to adjust the RF signal input to the phase/amplitude modulators 70. A non-limiting example of an acceptable amplitude modulator (such as an attenuator) is available from General Microwave under part number 3488. Because the polarization modulation weighting coefficients 72 vary depending on the platform to be simulated, the polarization modulation weighting coefficients 72 suitably are input to the system 22 as part of target platform data that characterizes the target platform. Coordinated use of phase and amplitude coefficients allows the system 22 to generate all polarization formats from each dual feed antenna driven by the transmitter 28.

An RF output signal from one transmitter channel is provided from the transmitter Unit 28 to a co-polarization (or co-pol) transmit antenna aperture 74. Another RF output signal (that has been phase shifted and/or attenuated by the programmable phase/amplitude modulators 70) is provided from the other transmit channel of the transmitter 28 to an orthogonal polarization (or cross-pol) transmit antenna aperture 76. Referring additionally to FIG. 13B, in one non-limiting embodiment a dual linear polarized antenna 78 and/or a dual polarized circular polarized antenna 80 suitably are used to generate a polarmetric signature of a simulated target. In the antenna 78, the co-pol transmit antenna aperture 74 is coupled to receive its RF signal via a port 82 and the cross-pol antenna aperture 76 is coupled to receive its RF signal via a port 84. In the antenna 80, the co-pol transmit antenna aperture 74 is coupled to receive its RF signal via a port 86 and the cross-pol antenna aperture 76 is coupled to receive its RF signal via a port 88.

Radar returns from different parts of a target, such as without limitation an aircraft's nose, tail, and the like, arrive at the weapon system 14 or the radar system 16 at different times. Time variations that are much larger than the tracking gate of the weapon system 14 or the radar system 16 could cause problems for the weapon system 14 or the radar system 16.

Embodiments of the present invention simulate such range extension and extent noise, thereby returning a realistic modulated radar signal 20 that includes increased range extent and range extent noise that can stress the weapon system 14 or the radar 16. In an exemplary embodiment, the simulated platform 12 is broken down into segments, referred to as tapped delay segments, that are small enough that the weapon system 14 or the radar system 16 sees one continuous and varying RF return equivalent to the platform being simulated, such as the full-sized aircraft 12.

Figure 14A:
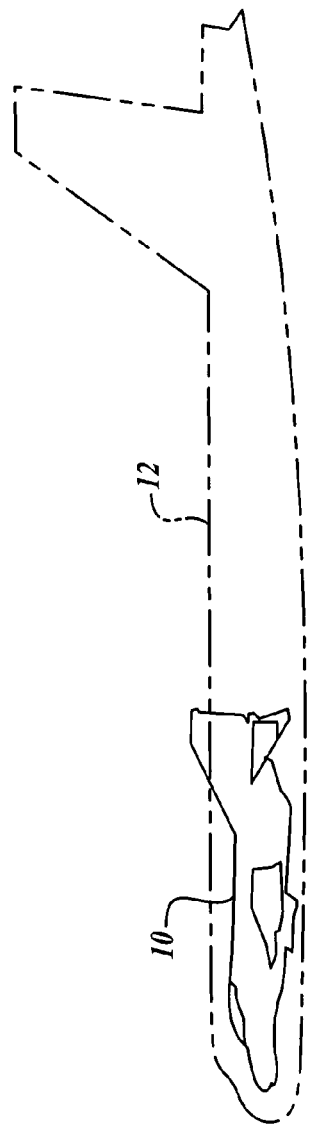
FIGS. 14A and 14B illustrate range extent noise.
Figure 14B:
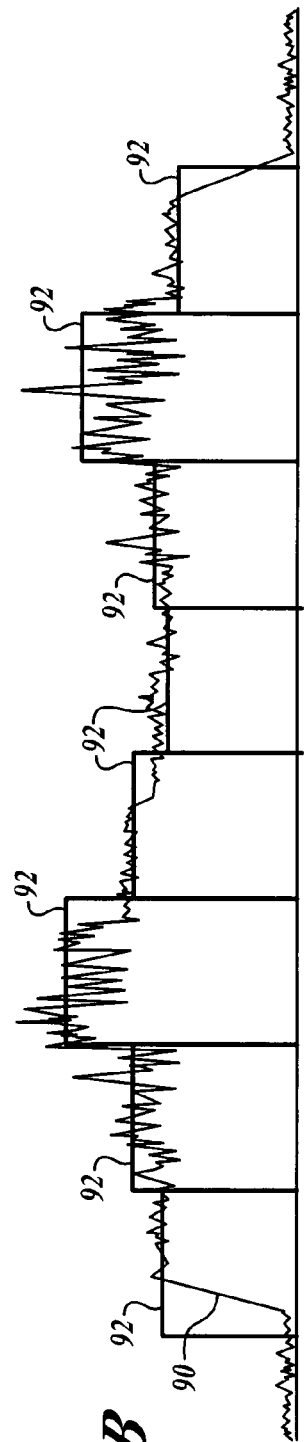

Referring now to FIGS. 14A and 14B, time modulation (or range extent noise) is illustrated. A relatively long target such as a bomber can generate large variation in radar tracking ranges. This variation could result in increased miss distance in the case of an attacking missile. In an exemplary embodiment, the system 22 simulates this phenomenon using tapped delay lines (described below) to generate multiple scattering points. Given by way of non-limiting example, an RCS range profile 90 for the simulated platform 12 is approximated by tapped delay segments 92. The number of delay segments 92 is determined by the length to be simulated, and the desired radar range resolution determines spacing between the delay segments 92. For example, a complex target such as a bomber aircraft would have many of the delay segments 92. Each segment 92 has different and varying amplitude characteristics. Programmable attenuation is employed on each tap to provide programmable amplitude weighting, as described in detail below. The programmable attenuation permits controlling signal strength of each individual segment 92 from a maximum level to completely off, thereby resulting in time/range extent modulation. The total power from all taps is controlled to simulate the RCS of the simulated platform 12. RCS noise is then added to each tap to simulate the dynamic variability of an actual range extended target signal.

All of the target signature facets (that is, radar cross section, scintillation, JEM/PEM, glint, and range noise) are aspect dependent. To that end, embodiments of the present invention determine aspect of the incoming radar signal 18 to determine appropriate parameters (such as weighting, attenuation, and modulation coefficients) for modulating the incoming radar signal 18 to the generate the modulated radar signal 20 and transmit the modulated radar signal 20 to the weapon system 14 or the radar system 16. In a presently preferred embodiment, the system 22 determines aspect of the incoming radar signal 18 by direction finding techniques that determine azimuth and elevation of the incoming radar signal 18. The presently preferred embodiment that uses direction finding techniques will be discussed first. In an alternate embodiment, a sector approach is used to provide coverage for different angular sectors. The sector approach will be explained after the direction finding technique is explained.

Figure 15:
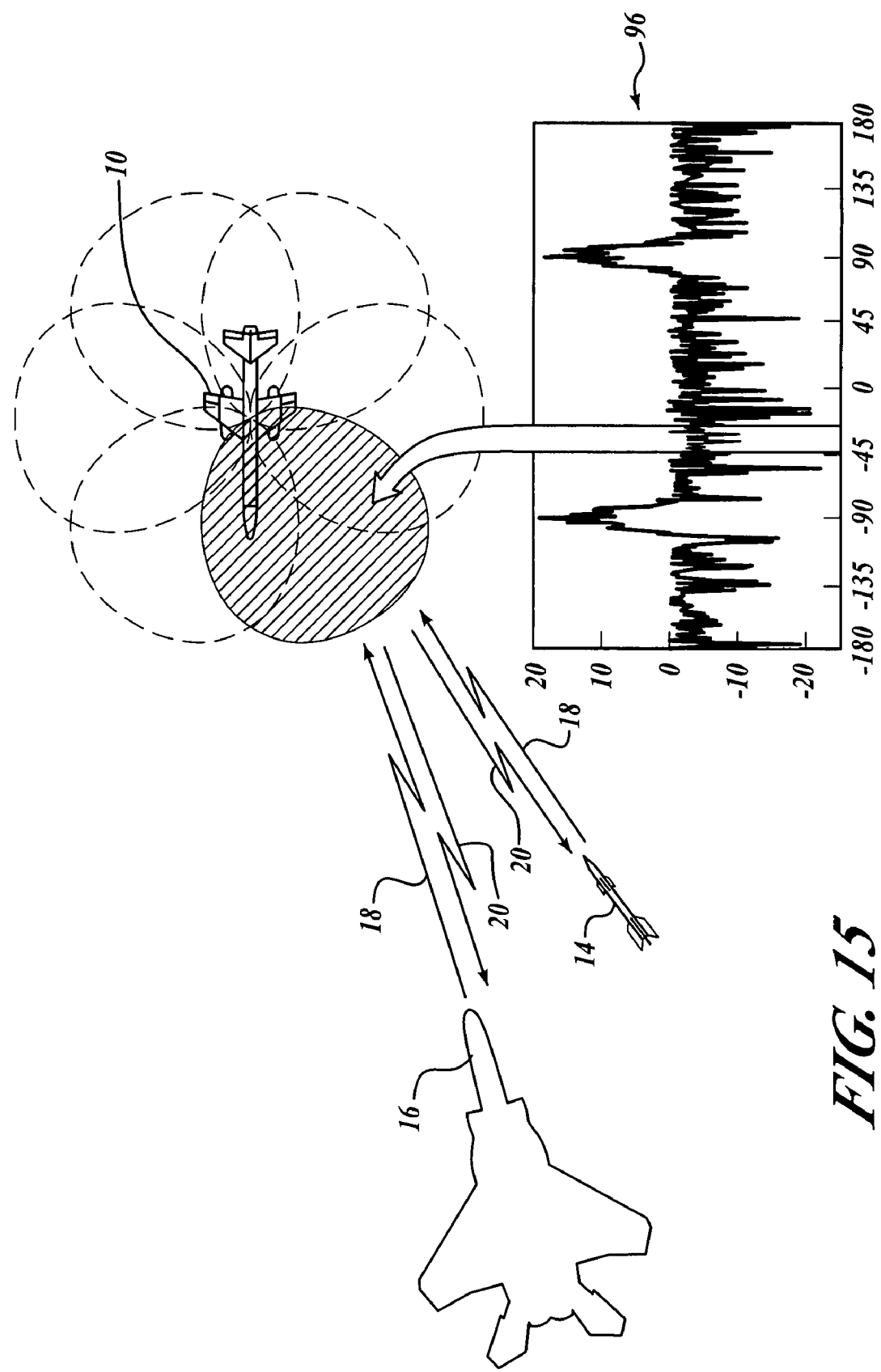
FIG. 15 illustrates dependency on angle-of-arrival of the incoming radar signal.

Referring now to FIGS. 2 and 15, in one presently preferred embodiment the system 22 uses a directional finding unit (DFU) 94 to search and track the incoming radar signal 18 and generate an appropriate signature (that is, the modulated radar signal 20) based on angle-of-arrival (AOA) in both azimuth and elevation planes of the incoming radar signal 18. A memory look-up table (not shown) within the DFU 94 stores modulation parameters 96 (sometimes referred to as signature data), such as weighting, attenuation, and modulation coefficients that vary according to azimuth angle and elevation angle of the incoming radar signal 20.

Now that the signal facets and aspect dependency have been discussed, details of exemplary embodiments of the present invention will be explained.

Referring back to FIG. 2, the system 22 includes several major functions that will be discussed in detail below. Emulating aspect-dependent RF signature of a target entails use of the Directional Finding Unit (DFU) 94 that is capable of searching and tracking, in angles, various emitters of the incoming radar signal 18. The Front End Unit (FEU) 24 serves as a switching network, directing the incoming radar signals 20 from various receive antennas 98 to appropriate sub-systems, such as the SGU 26 and the DFU 94. In one present embodiment, the receive antennas 98 suitably are three channel antennas. The DFU 94 uses two pair of the three channel receive antennas 98 at any given time to determine the AOA, in both azimuth and elevation planes simultaneously, of the incoming radar signal 18. The Signature Generator Unit (SGU) 26 includes circuits to phase, amplitude, polarization, and time modulate the incoming radar signal 18 to generate the modulated radar signal 20 that is indicative of the simulated platform 12 (FIG. 1), thereby simulating effects that would have been induced by an actual target. If desired, a Crypto/Telemetry Unit 102 and telemetry transmit antennas 104 may be included to send encrypted operational parameters to a ground station to support flight test data analysis.

The RF signals modulated by the SGU 26 are amplified and directed to an appropriate pair of transmit antennas 100 by the transmitter 28. The transmit antenna selection is optimized to direct the return signal (that is, the modulated radar signal 20) back in the direction of the weapon system 14 or the radar system 16 under test.

Figure 16:
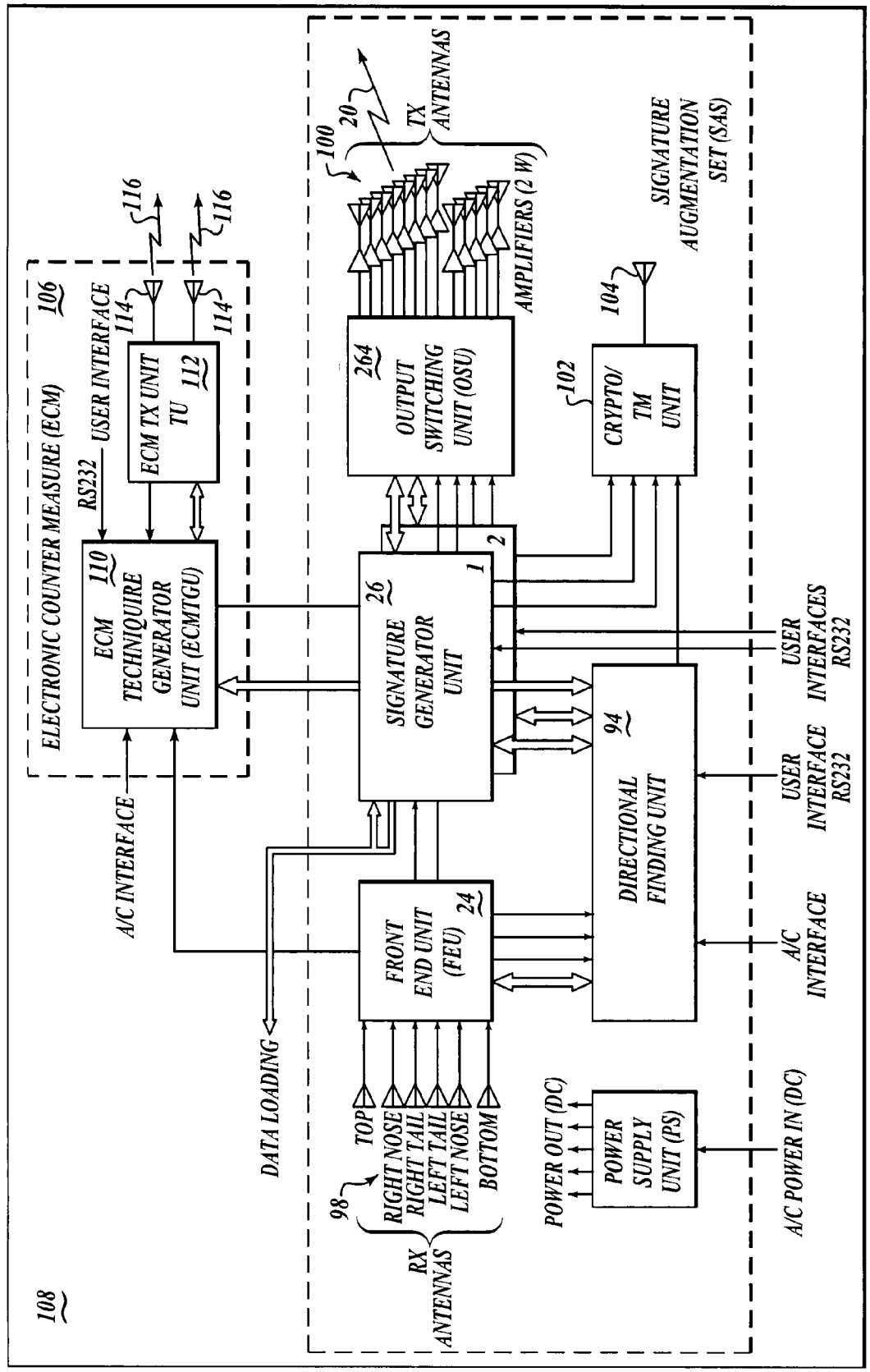
FIG. 16 is a block diagram of an exemplary radio frequency signature augmentation system with ECM capability according to an alternate embodiment of the present invention.

Referring briefly to FIG. 16, in an alternate embodiment an Electronic Counter Measure (ECM) suite 106 can be integrated in a system 108 to simulate a threat aircraft (not shown) with an onboard jammer. The system 108 may be used for weapon system testing that evaluates response of a weapon system to electronic counter measures. An ECM technique generator unit 110 generates ECM effects, such as jamming signals. Output from the ECM technique generator unit 110 is provided to an ECM transmitter 112. RF energy from the ECM transmitter is provided to ECM transmit antennas 114 that transmit ECM signals 116. The ECM suite 106 can be provided as an external ECM system or can be built into the system 108 for compactness and component sharing, thereby resulting in cost savings and size reduction. The system 108 includes the receive antennas 98, the FEU 24, the SGU 26, the DFU 94, the transmitter 28, the transmit antennas 100, the crypto/telemetry unit 102 and telemetry transmit antennas 104 (if desired), as previously discussed for the system 22 (FIG. 2). For the sake of brevity, details of components common with the system 22 need not be repeated. If desired, an additional SGU 26 may be included to handle another weapon system independently. In this alternate embodiment, a more complex output switching unit (OSU) 264 performs the functions previously described for the transmitter 28.

Figure 17B:
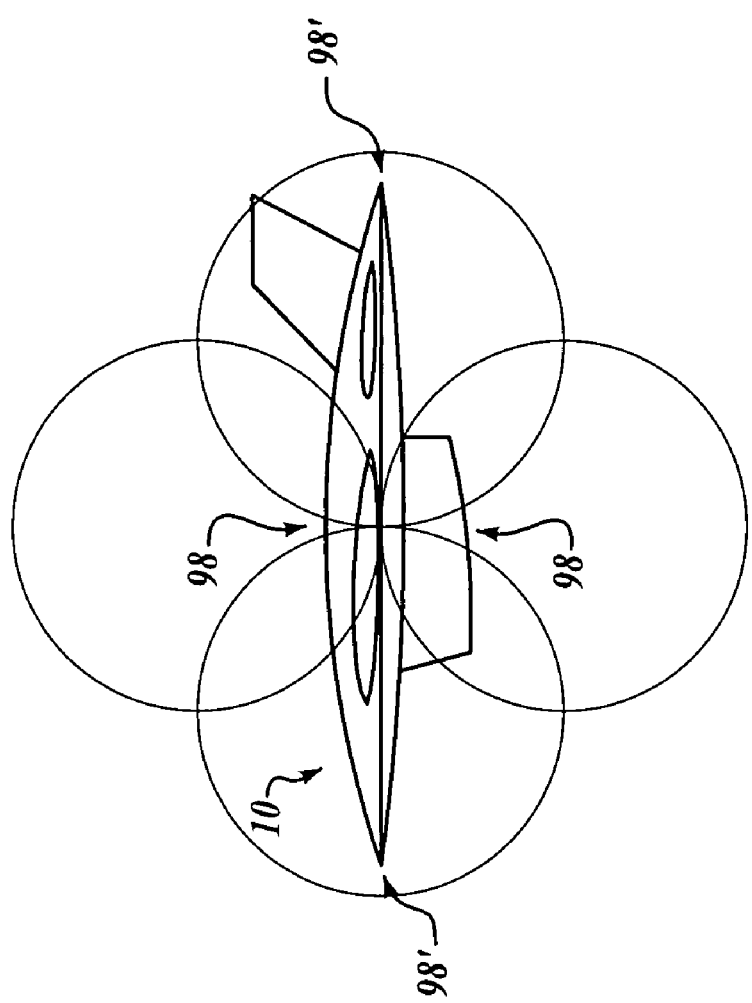

Referring now to FIGS. 2, 17A, and 17B, the receive antennas 98 provide spherical coverage. In one exemplary embodiment, the system 22 includes at least six of the receive antennas 98. The receive antennas 98 are circularly polarized. Functionally, a total of at least six 90 degree beam Right Hand Circular Polarized (RHCP) receive antennas (or an equivalent array of conformal antenna) are shared between the DFU 94 and the SGU 26. The antennas 98 are configured to provide spherical coverage and to provide the DFU 94 a means for measuring the AOA (Angle-of-Arrival) of the incoming radar signal 18 to an estimated accuracy of around 9 degrees rms (root mean squared).

Referring to FIG. 17A, four of the receive antennas 98 provide overlapping patterns around the host platform 10 and are separated by 90° in the azimuth plane. The antenna patterns are depicted as being in the center of the target vehicle although the physical placement may be without limitation at the nose and tail. Referring to FIG. 17B, in addition to the receive antennas 98 in the horizontal plane shown in FIG. 17A, two additional receive antennas 98 are configured to point up and down to provide elevation AOA measurement capability. If desired, additional receive antennas 98' may be provided at fore and aft ends of the host platform 10 to provide higher fidelity spherical coverage in the elevation plane.

Figure 17C:
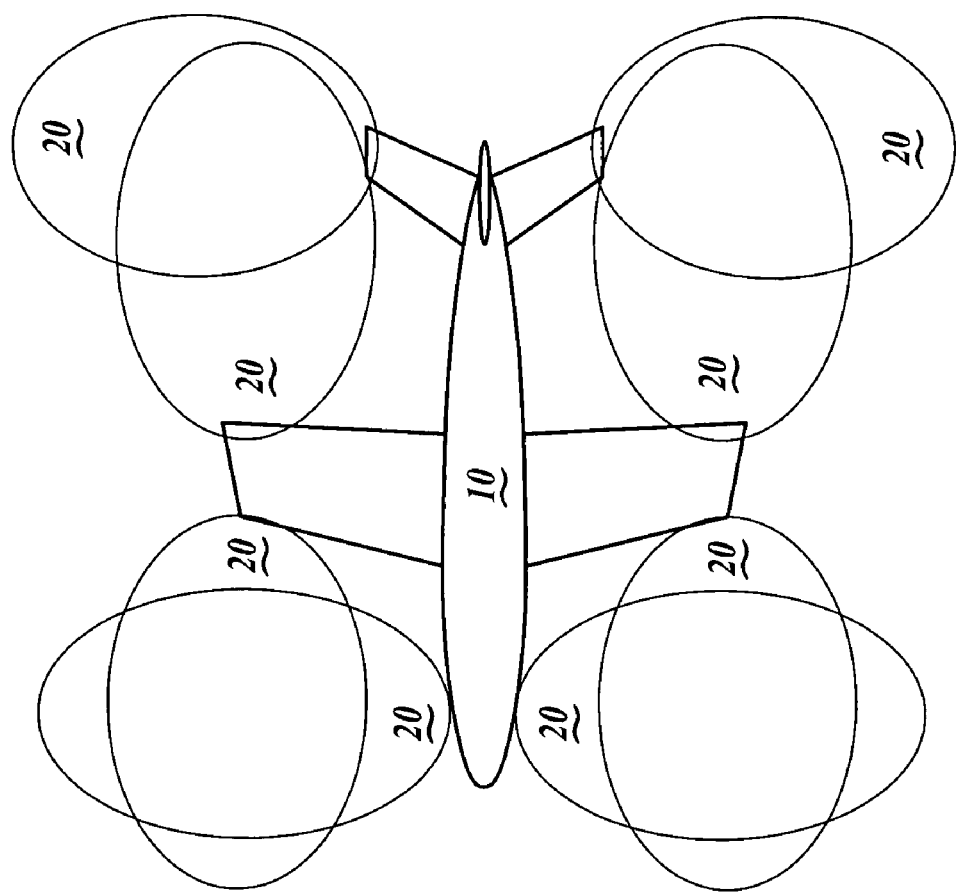

Referring to FIG. 17C, the transmit antennas 20 are dual linear to generate a polarmetric signature. The SAS transmit antennas are distributed along extremities of the host platform 10 to simulate the effect of multiple scatters from that of a larger target. In one present embodiment, functionally the transmit antennas 20 include a minimum of eight of the vertically polarized hemispherical or fan beam (±45 degrees azimuth x ·90 degrees elevation) antennas used to generate glint over 4π coverage. Ninety degree beam antennas are common and suitably are used to generate a glinting augmented signature for ±180 degrees in azimuth and ±45 degrees in elevation. Additional dual polarized linear antennas (not shown) are used to generate a non-glinting polarized target signature. In addition, vertically orientated antennas may be used to provide spherical coverage, or to fill angular gaps on top and bottom of the target, providing a non-glinting signature. Finally, two ECM transmit antennas (not shown) may be used with 60 degree conical beams and circular polarization configured to radiate in either forward or aft directions.

Figure 18:
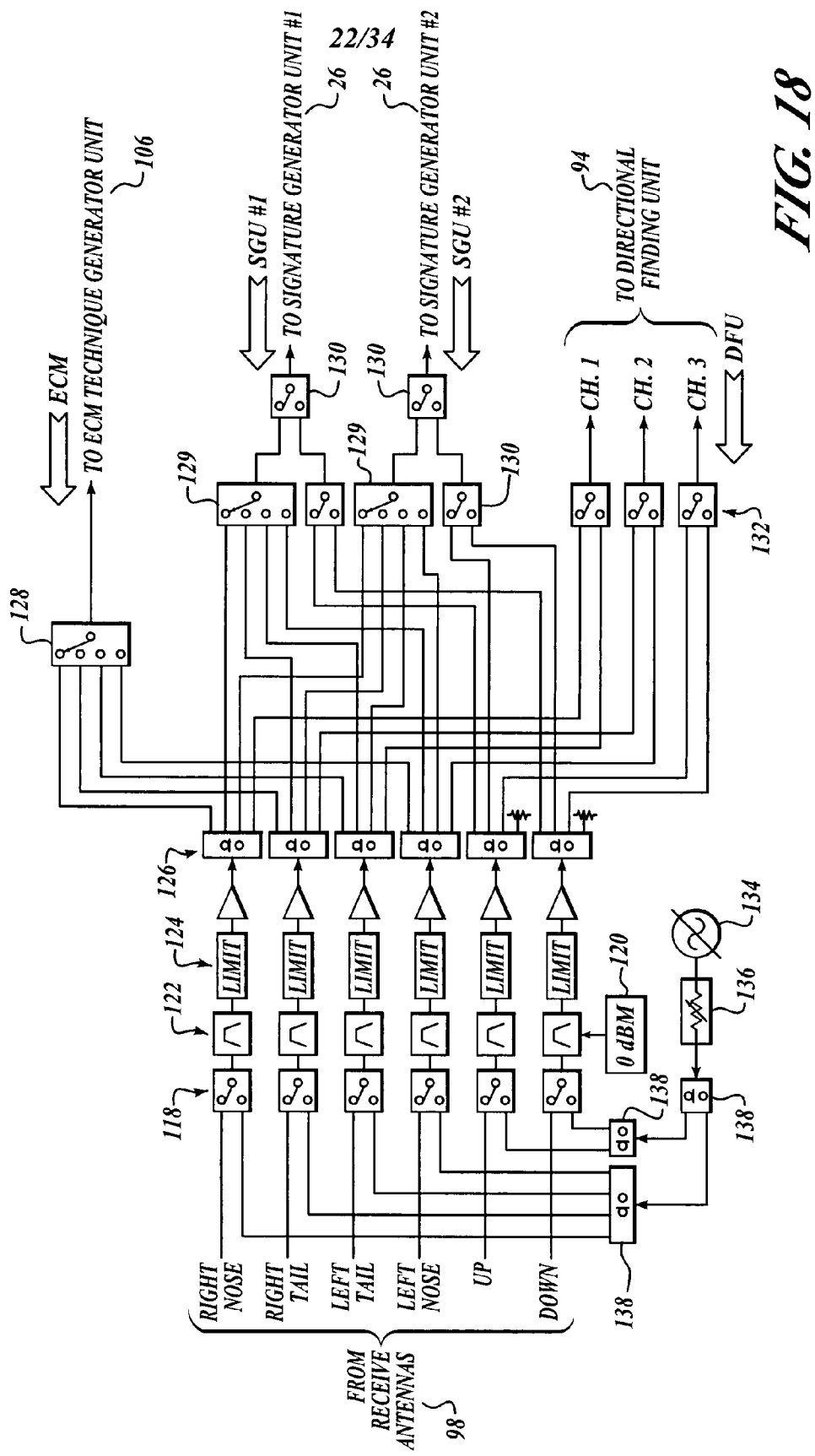
FIG. 18 is a block diagram of the front end unit.

Referring now to FIGS. 2, 16, and 18, the primary function of the Front End Unit (FEU) 24 is to direct the radar signals captured by the receive antennas 98 substantially simultaneously to the DFU 94, the SGU 26, and, if provided, any additional SGU 26 (FIG. 16) and the ECM suite 106 (FIG. 16). Switches (or relays) 118 are coupled to receive signals from the receive antennas 98. The switches 118 suitably have switch times less than around 5 ms or so. Band pass filters 120 are coupled to the switches 118 and reject unwanted signals. Limiters 122 are coupled to the band pass filters 120, and prevent system damage and minimize unwanted harmonics induced by high input signal levels. Low noise amplifiers (LNAs) 124 are coupled to receive output signals from the limiters 122, and boost low level signals.

Dividers 126 and switches to distribute the signals to the various units as follows. A relay 128, suitably with a switch time of less than around 5 ms or so, supplies the signal to the ECM suite 106 (FIG. 16), if provided. A switch assembly 129, 130, with a switch time of less than around 10 μs or so, supplies the signal to the SGU 26. Another switch assembly 129, 130 supplies the signal to any additional SGU 26 (FIG. 16), if provided. A PIN switch 132, suitably with a switch time of less than around 10 μs or so, supplies the signal to the DFU 94. A voltage controlled oscillator (VCO) 134 can be tuned in frequency, tailored in amplitude by a digital controlled attenuator 136, and injected via dividers 138 into the primary receive signal paths at the switches (or couplers) 118 for use in conducting built-in-test functions, if desired.

Each of the DFU 94, the SGU 26 (and any additional SGUs 26 that may be provided), and the ECM suite 106, if provided, advantageously has direct and independent control of the FEU 24 to access the incoming radar signals 18 from any of the receive antennas 98 without interfering with each other.

Figure 19:
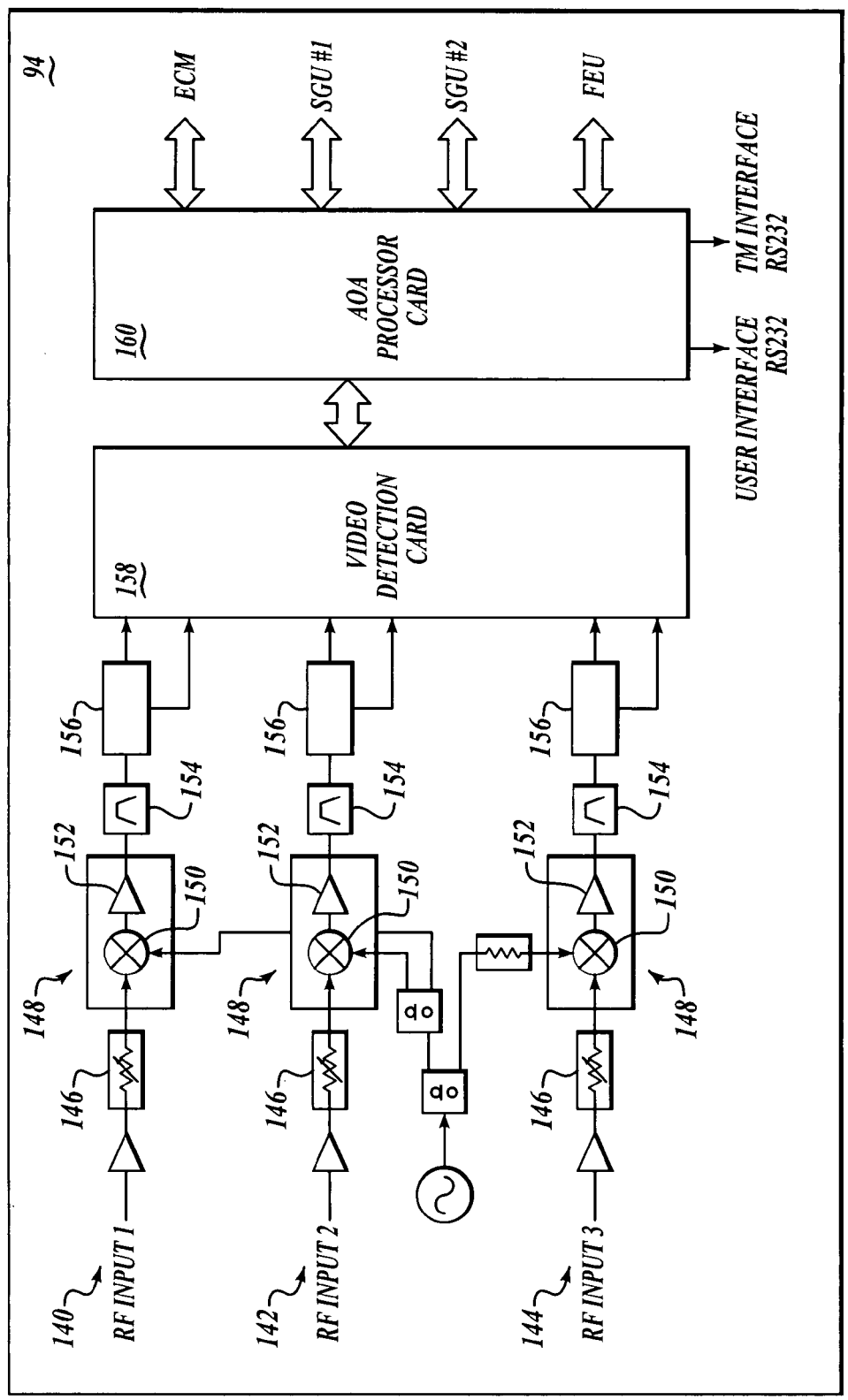
FIG. 19 is a block diagram of the direction finding unit.

To measure and track the directions of the incoming radar signals 18 in a multiple emitter environment, azimuth and elevation angles are determined simultaneously. Referring now to FIGS. 2 and 19, the DFU 94 accomplishes this measurement and tracking by use of three channels 140, 142, and 144. The channels 140 and 142 are dedicated to measure azimuth AOA while the channel 144 in conjunction with one of the other channels 140 or 142 is used to measure elevation AOA. All three channels 140, 142, and 144 comprise a match set, and the first channel 140 will be described next. Each channel includes a programmable attenuator to balance the gain of all the possible input signal paths used for AOA measurements which are based on an amplitude comparison technique. Down converter devices 148, each including a mixer 150 and an amplifier 152, convert RF input signals to a lower frequency band where signal processing components are readily available. Down-converted signals from the down converter devices 148 are filtered by filters 154. Wide band and high dynamic range log detectors 156 are used to convert the down-converted signal to video pulses AMI and frequency discriminator voltages FM1 so that amplitude levels of the radar signals can be determined. The FM1 signal is used by subsequent tracking processing to aid classification of multiple emitters.

The DFU 94 has two primary digital circuit cards—a Video Detection Card (VDC) 158 that converts input video pulses AM1-3 and frequency discriminator voltages FM1-3 to digital data for input to the AOA Process Card (APC) 160 that provides AOA information regarding the incoming radar signal 18.

Figure 20:
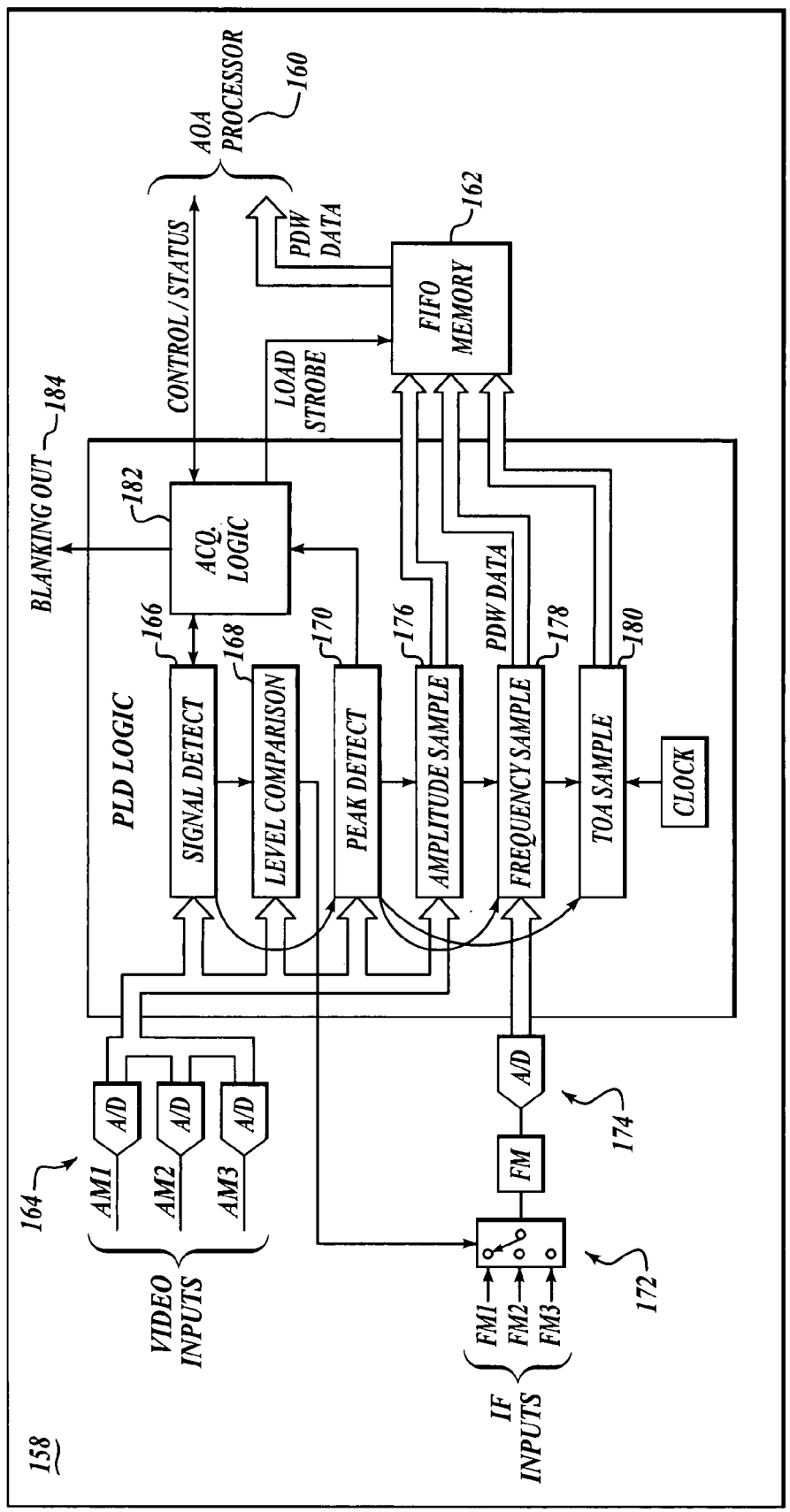
FIG. 20 is a functional block diagram of a video detector card.

Referring additionally now to FIG. 20, the Video Detection Card (VDC) 158 functions as a front-end processor of radar pulses to provide information about the received pulses to the AOA Processor Card (APC) 160. The primary function of the VDC 158 is to measure specific parameters of the input pulses and then provide this information in the form of a "pulse description" message block. The pulse parameters consist of peak amplitude, frequency, Time-Of-Arrival, and an amplitude profile. Upon deriving these parameters, the VDC 158 stores the data in a FIFO (First-In First-Out) memory buffer 162 which functions as an interface to the APC 160.

The process of gathering pulse information is initiated by simultaneously latching data signals AM1, AM2, and AM3 from the three input channels 140, 142, and 144. The input data signals AM1, AM2, and AM3 consist of pulse amplitudes that are digitized by A/D converters 164. Signal detect logic 166 triggers a level comparison circuit 168 and a peak detection circuit 170. The level comparison circuit 168 determines which input channel AM1, AM2, or AM3 contains the highest amplitude and actuates a switch 172 to switch an FM digitizer 174 to a corresponding channel FM1, FM2, or FM3. Upon reception of a valid input pulse, a pulse description word (PDW) amplitude DATA, frequency data, and time of arrival data is generated and stored in the FIFO memory buffer 162 for transfer to the APC 160.

The VDC 158 performs these operations by using seven functional sections: the signal detect logic 166, the level comparison circuit 168, the peak detection circuit 170, an amplitude sampling circuit 176, a frequency sampling circuit 178, a time of arrival measuring circuit 180, and an acquisition logic section 182.

Signal detection occurs when the input signals AM1, AM2, and AM3 exceed specific threshold values, which are predetermined by the APC 160. The three digitized inputs AM1, AM2, and AM3 are simultaneously compared to a unique threshold value for each channel. When signal detection occurs, the signal detect logic 166 informs the acquisition control logic 182 to begin pulse processing.

Level comparison is performed to determine which input channel AM1, AM2, or AM3 exhibits the greatest signal strength. The strongest input channel AM1, AM2, or AM3 is then selected for recording FM signal measurements. Channel comparison is accomplished by a simple binary magnitude comparison of the input amplitude data. The channel selection is made when the input signal detect logic 166 indicates reception of a valid pulse.

The peak detection circuit 170 determines when the pulse has reached amplitude stability. The parameters used for adjusting are keyed to the number of samples of like level after an initial rise above the detection threshold. The sample time associated with this stability determination is then used as the trigger point for amplitude, frequency, and time measurements during the remainder of the pulse.

The amplitude sampling circuit 176 gathers amplitude data on the incoming pulse. The amplitude data is included in the pulse description word PDW, which is generated for each pulse.

The frequency sampling circuit 178 gathers frequency data on the incoming channel. The frequency data is also included in the pulse description word PDW generated for each pulse.

The time of arrival (TOA) measuring circuit 180 generates pulse arrival time data. The TOA data is also included in the pulse description word PDW generated for each pulse.

The acquisition logic section 182 provides overall digital control in the process of gathering the pulse detection data for the pulse description word PDW. The primary functions of the acquisition logic section 182 are to provide an interface to the APC 160 for programming control parameters, to control the FIFO memory buffer 162 for loading and unloading the pulse description words PDW, and to provide overall circuit control and timing. The acquisition logic section 182 also provides a blanking output, which is used to blank the optional ECM suite 106 (FIG. 16) during the data acquisition process.

The APC 160 consists of a dedicated micro-controller (not shown) and an associated interface implemented to transform the signal description words—amplitude levels from the amplitude sampling circuit 176, frequencies from the frequency sampling circuit 178, and time of arrival data from the time of arrival measuring circuit 180—into trackable angles in both azimuth and elevation on the emitters. Suitable non-volatile memory (not shown) stores uploadable software code for the controller (not shown) and emitter tacking parameters. The APC 160 assigns the SGU 26 to a specific frequency band and directs the SGU 26 to generate augmented target signatures at appropriate angles. Alternately, when more than one SGU 26 is provided (FIG. 16), the APC 160 assigns each SGU 26 to its own specific frequency band and directs the SGUs 26 to generate augmented target signatures at appropriate angles.

Other tasks performed by the APC 160 include: setting up initial values, windows, and limits on the Video Detection Card 158; performing periodic angle search for emitters by sequentially selecting receive antennas 98 through the FEU 24; activating a built-in-test (BIT) signal for self-test when requested by the SGU 26 and/or the optional ECM suite 106 (FIG. 16); and momentarily blanking the optional ECM suite 106 (FIG. 16) and the SGU26 for look-through without degrading their performance.

Figure 21:
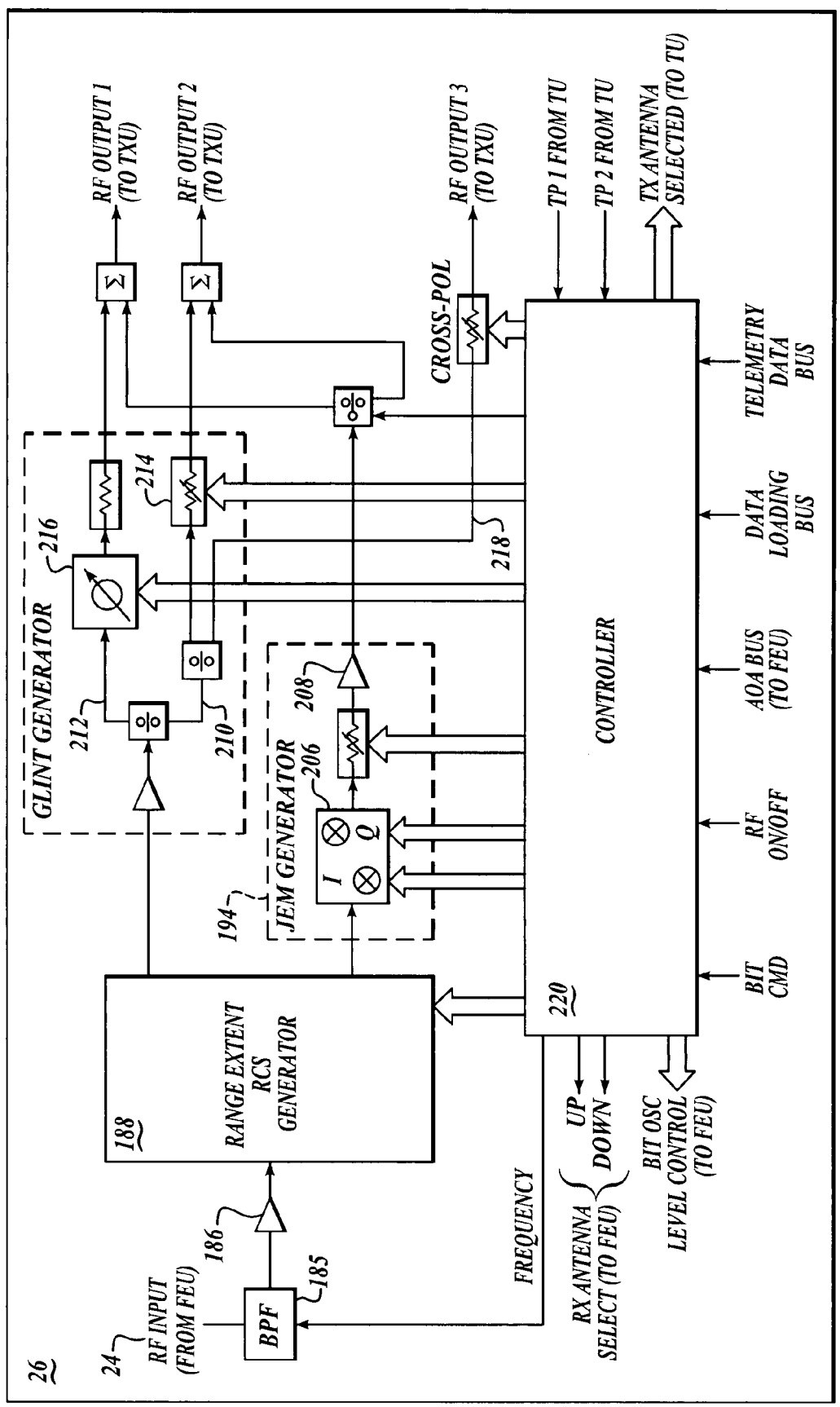
FIG. 21 is a block diagram of a modulator or signal generator unit.
Figure 22:
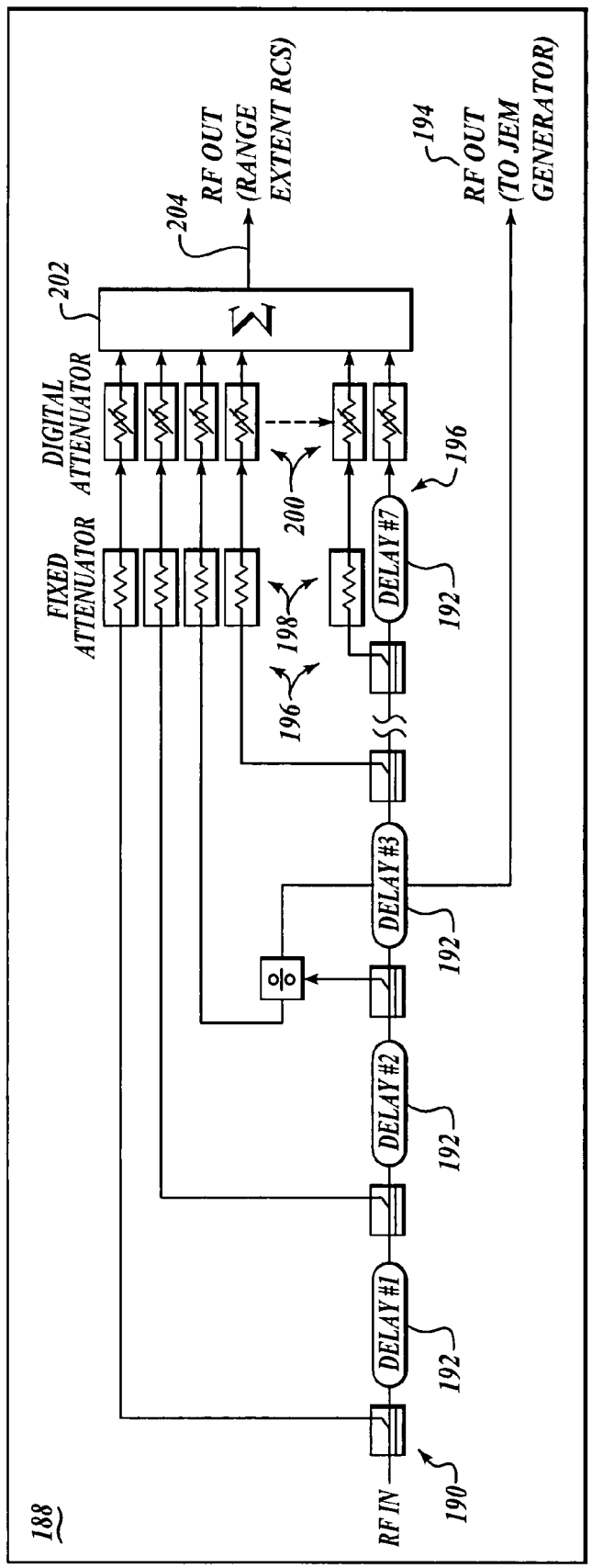
FIG. 22 is a block diagram of a range extent radar cross section generator.

Referring now to FIGS. 2 and 21, the Signal Generator Unit (SGU) 26 phase, amplitude, time, and polarization modulates the incoming radar signals 18 to simulate all aspects of signal facets of the simulated platform 12 (FIG. 1). The RF input from the FEU 24 is first filtered by a band pass filter 185 and amplified by an amplifier 186, and then distributed throughout a range extent RCS generator 188 to generate a target with a desired range extent and RCS gain. Referring additionally to FIG. 22, in the range extent RCS generator 188 a signal path 190 is tapped off at an appropriate delay to feed a JEM generator 194 to simulate a simulated platform 12 such as an aircraft whose engines reside at some distance relative to its leading edge. The JEM tap may be variable, or fixed as in this non-limiting example, depending on the test requirements. Remaining tapped delay lines 196 are attenuated in fixed attenuators 198 and programmable attenuators 200, and combined by a summing circuit 202 into a single output signal 204 to simulate the signal facets of a signature of spatially-distributed reflecting elements of the simulated platform 12. The number of tapped delay lines 196 and the line length resolution are chosen to accommodate the overall length of the simulated platform 12 and the ability of the weapon system 14 (FIG. 1) or the radar system 16 (FIG. 1) to resolve that length. The combined range extended signal 204 is further divided into three paths within the SGU (FIG. 21) to generate glint and polarization facets, as described above regarding FIGS. 10 and 13. The characteristics of the simulated platform 12 are used to derive a time varying statistical weighting function for the attenuator settings. Each attenuator is provided with digital settings based on the model or derived from actual RCS measurements. The model uses AOA data to shape the range extent for the changing look angle relative to the observing radar 16. The total output of all taps determines the RCS gain profile for the simulated target signature (FIG. 14b).

Referring back to FIGS. 2 and 21, the JEM generator 194 generates JEM by vector modulating in a vector modulator 206 the JEM output signal from the range extent RCS generator 188 with in phase (I) and quadrature (Q) waveforms predetermined to produce the desired Doppler spectrum. Target RCS is generated by amplifying with an amplifier 208 the radar signal to a level representative of a given size return. Scintillation and glint are generated by amplitude and phase modulating two spatially separated augmented RCS output signals 210 and 212, respectively, with an amplitude modulator 214 and a phase modulator 216, respectively. A cross-polarized component of the augmented RCS is produced by providing a third RCS output signal 218 radiating through a set of independent cross-pol antennas (FIG. 13A).

Figure 23:
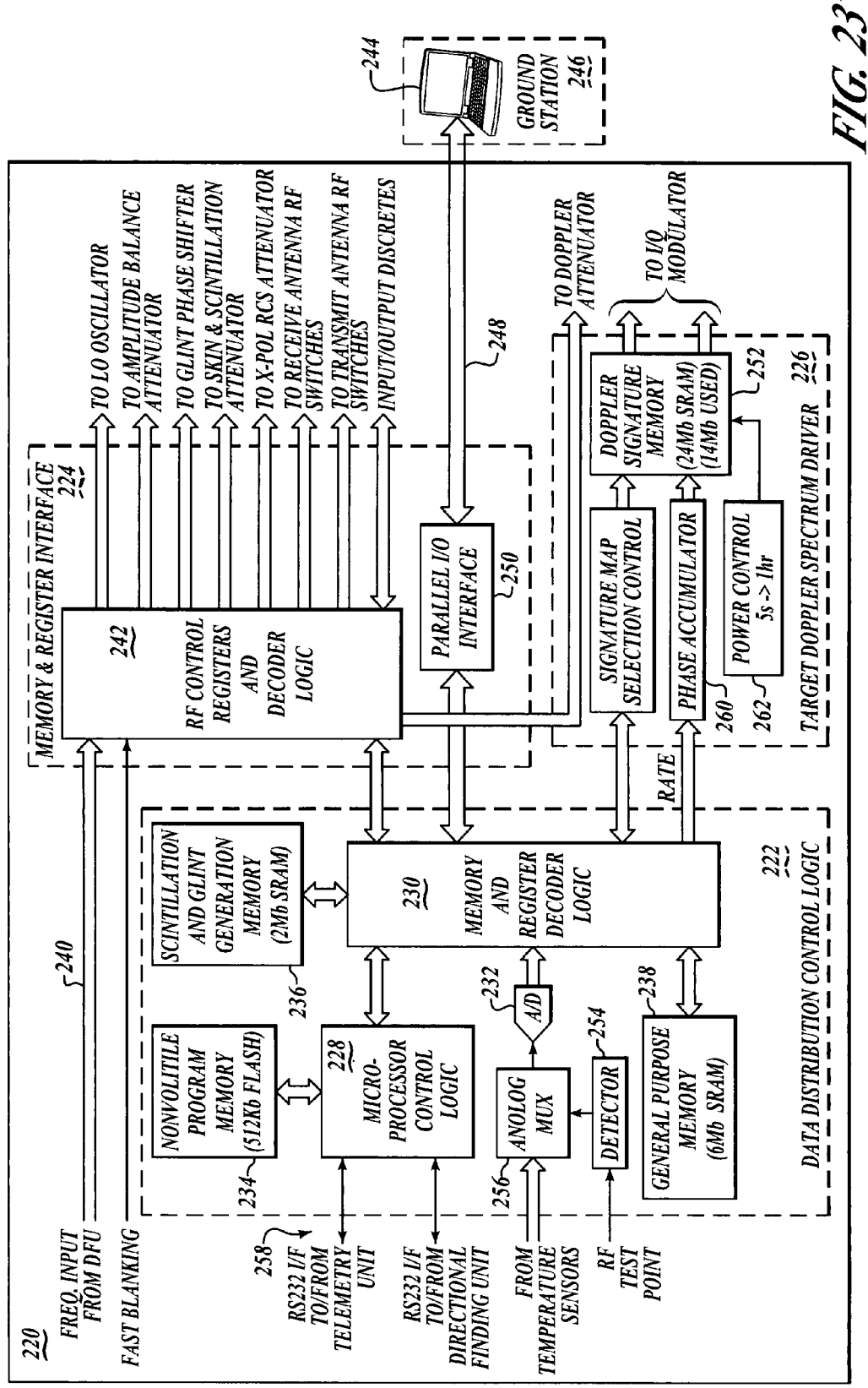
FIG. 23 is a functional block diagram of a controller for the signal generator unit.

The functions of the SGU 26 suitably are controlled and maintained by a dedicated SGU controller 220. Referring additionally now to FIG. 23, the main function of the SGU controller 220 is to provide signature data to the RF components within the SGU 26. The data provided is based on Angle-Of-Arrival (AOA) information received from the DFU 94. This operation enables the SGU 26 to augment the signature of the host platform 10 (FIG. 1) by controlling the skin/RCS, scintillation, glint, and Doppler signal facets of a radar return. All of the parameters associated with this augmentation are programmable. Uploading "signature data" into memory of the SGU 26 prior to a mission provides programmability. During a mission, the SGU controller 220 performs the task of updating the RF components with appropriate augmentation data fetched from memory. Within the SGU controller 220, this task is accomplished by using three functional hardware sections: data distribution control logic (DDCL) 222, a memory and register interface (MRI) 224, and a target Doppler spectrum driver (TDSD) 226.

The data distribution control logic (DDCL) 222 is the central processor of the SGU controller 220. The DDCL 222 contains a microprocessor with associated control logic along with a memory/register decoder 230, an analog-to-digital converter 232, and memory blocks. For example, in one embodiment the memory blocks include nonvolatile program memory 234 such as around 512 Kb of FLASH memory, scintillation and glint generation memory 236 that may be provided as around 2 Mb or so of static random access memory (SRAM), and general purpose memory such as around 6 Mb or so of SRAM. The microprocessor 228 provides a link between all of the functional elements within the SGU controller 220 as well as a link to each of the external system components which interface to the SGU 26.

The primary function of the data distribution control logic 222 is to fetch data from memory and then write it to control registers located within the memory and register interface 224. The particular data that is fetched from memory is based on Angle-Of-Arrival (AOA) information received from the DFU 94 via a serial interface 240. The data stored in memory is organized as "memory maps". Each memory map is assigned a unique location or "address" in memory based on the target's aspect angle relative to the received incoming radar signal 18. When the SGU 26 receives a new AOA angle, the SGU 26 computes a "map address" based on the AOA angle and then fetches data from that memory map. The data is then written to various RF control registers 242 which provide the desired angular-based augmentation.

The data provided to the SGU controller 220 for augmentation is initially uploaded from a computer 244 of a ground station 246 over without limitation a parallel data link 248. The DDCL 222 receives the signature data from a parallel I/O interface 250 in the memory and register interface 224 and then loads the signature data into the appropriate memory maps. Some of the memory (in this case, the scintillation and glint memory 236 and the general purpose memory 238) is tied directly to the microprocessor's internal data bus (not shown) within the DDCL 222, while other portions of the memory (in this case, Doppler signature memory 252 provided as around 24 Mb or so of SRAM) are contained within the target Doppler spectrum driver 226. The memory/register decoder 230 supports the interface between the microprocessor 228 and the memories.

A secondary function of the DDCL 222 is to provide a built-in-test (BIT) capability. The BIT operations include testing internal memory and hardware registers, performing RF continuity checks, performing an RF gain calibration, and monitoring system component temperatures. The BIT operations use the control registers 242 for outputting data. The BIT operations also use the analog-to-digital converter 232 to convert analog signals received from an RF signal detector 254 and an analog multiplexer 256 and temperature sensor inputs received from the analog multiplexer 256.

The Data Distribution Control Logic 222 also supports a telemetry data link 258. During real-time operation (that is, during a mission), while the DDCL 222 is updating the RF control registers 242, the DDCL 222 is also acquiring telemetry data and sending the telemetry data to the crypto/telemetry unit 102 over a serial port, such as an RS232 interface.

The memory and register interface (MRI) 224 provides an interface between the DDCL 222 and RF components responsible for augmenting the skin of the host platform 10 (FIG. 1) and the components which select the RF antennas. The MRI 224 contains several RF control registers 242 along with decoder logic. Data is received from the DDCL 222 and written into hardware registers to control the skin RCS & scintillation attenuators 200 (FIG. 22), the glint phase modulator 216 and the glint amplitude modulator 214 (FIG. 21), an oscillator DRO (FIG. 19), the BIT oscillator 134 (FIG. 18), antenna pointing switches for the receive and transmit antennas (FIGS. 2, 24, and 28), and Input/Output discretes (not shown) that are used for housekeeping functions.

The decoder logic receives a memory address from the microprocessor 228 along with read/write commands and decodes them to create data clock signals and output enable signals for the various RF control registers 242.

The MRI 224 also contains the parallel I/O interface 250, which allows signature data to be uploaded from the computer 244 of the ground station 246 over the data link 248. The data link 248 provides high speed uploading of signature data. Such high speed loading is desirable because of relatively large amount of signature data, such as around 32 Mbytes or so.

The target Doppler spectrum driver (TDSD) 226 is responsible for generating the Doppler facet of the modulated radar signal 20 of the simulated platform 12. The TDSD 226 does this by implementing a programmable frequency synthesizer that supplies time-domain data to an RF vector modulator (I/Q modulator) (not shown). The frequency synthesizer is composed of a phase accumulator 260, a "waveform look-up-table" implemented in the Doppler signature memory 252, and data output registers (not shown). The programmable waveform look-up-table is loaded with target signature data to implement the Doppler spectrum augmentation. The Doppler signature memory 252 is loaded with signature data during a pre-mission "upload" operation, which comprises 5184 "maps" of 4 Kbytes each. During the mission, signature data is clocked out of the synthesizer's waveform look-up-table and into the I/Q modulator (not shown) by hardware logic. The TDSD 226 also contains an attenuator (not shown) for controlling Doppler gain. The data for this attenuator is received from one of the RF control registers 242.

Another function of the TDSD 226 is to maintain integrity of the data in memory for a finite period of time following a loss of system power. The TDSD 226 contains a power control circuit 262 that is designed to maintain all of the signature memory voltages for at least five seconds but not greater than one hour following a loss of system voltages. When a power interruption of less than five seconds occurs, the SGU controller 220 will resume its normal operation and report any detected anomalies via the telemetry link 258.

Figure 24:
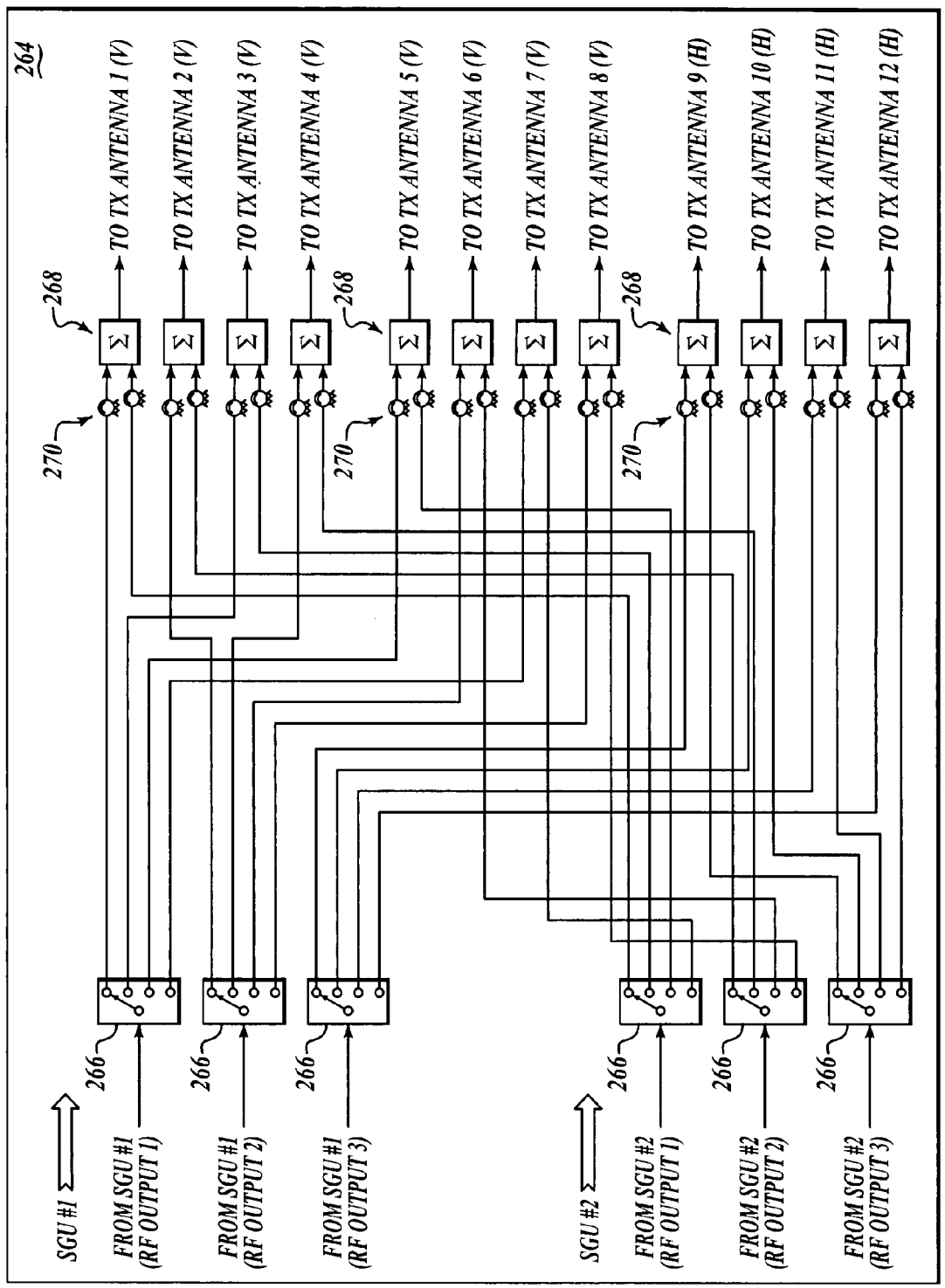
FIG. 24 is a block diagram of an output switching unit.

Referring now to FIGS. 16 and 24, in the alternate embodiment in which the system 108 includes more than one SGU 26, an output switching unit (OSU) is a junction where the augmented signatures generated by the SGUs 26 are selected, combined, and distributed to proper transmit antennas 100. A series of single. pole four throw (SP4T) RF switches direct each of three outputs from the SGUs 26 to specified transmitters 28 and transmit antennas 100. Combiners 268 combine two independent signatures when the independent signatures must share the same transmitters 28 and transmit antennas 100. RF isolators 270 reduce feedback from one SGU 26 to another SGU 26.

Figure 25:
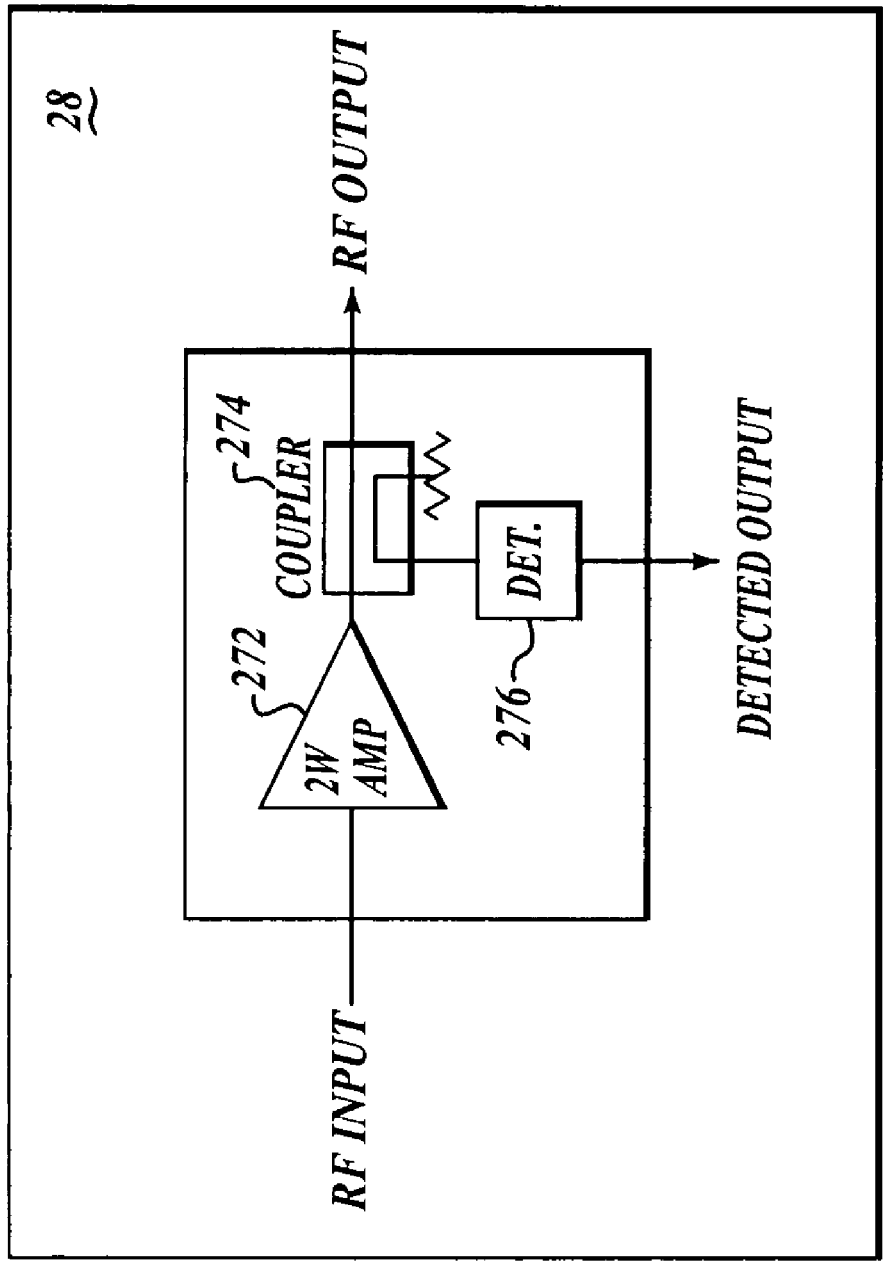
FIG. 25 is a block diagram of a transmitter.

Referring now to FIGS. 2 and 25, complexity of output antenna switching, which is determined by employment of more than one SGU 26 in the system 108 (FIG. 16), drives design of the transmitter 28. This approach enables the transmitter 28 to be used in either the system 22 or the system 108 (FIG. 16). The transmitter 28 includes of a series of solid state power amplifiers 272, such as 2 Watt amplifiers, that are distributed adjacent to the transmit antennas 100 rather than two centrally located higher power amplifiers, such as 10 Watt amplifiers. Each of the amplifiers 272 has a built-in coupler 274 and detector 276 for BIT and calibration purposes. This design allows the system 22 and the system 108 (FIG. 16) to use fewer and lower-cost RF cables for coupling to the transmit antennas 100. Heat generated by the amplifiers 272 is dissipated over a relatively large area through the skin of the host platform 10 (FIG. 1).

The various signature generation functions of embodiments of the present invention have been validated. For example, referring now to FIG. 26, RCS values as a function of aspect angle were closely replicated. A graph 278 plots RCS values in dBsm versus aspect angle in degrees. A curve 280 shows actual RCS of the host platform 10 (FIG. 1), such as a subscale aircraft. A curve 282 shows actual RCS of the simulated platform 12 (FIG. 1), such as a full-sized aircraft. A curve 284 shows RCS generated by an embodiment of the present invention that simulates RCS of the simulated platform 12 (FIG. 1). Nearly-coincident overlay of the curves 282 and 284 indicates validation of RCS augmentation capabilities of the present invention.

Figure 27B:
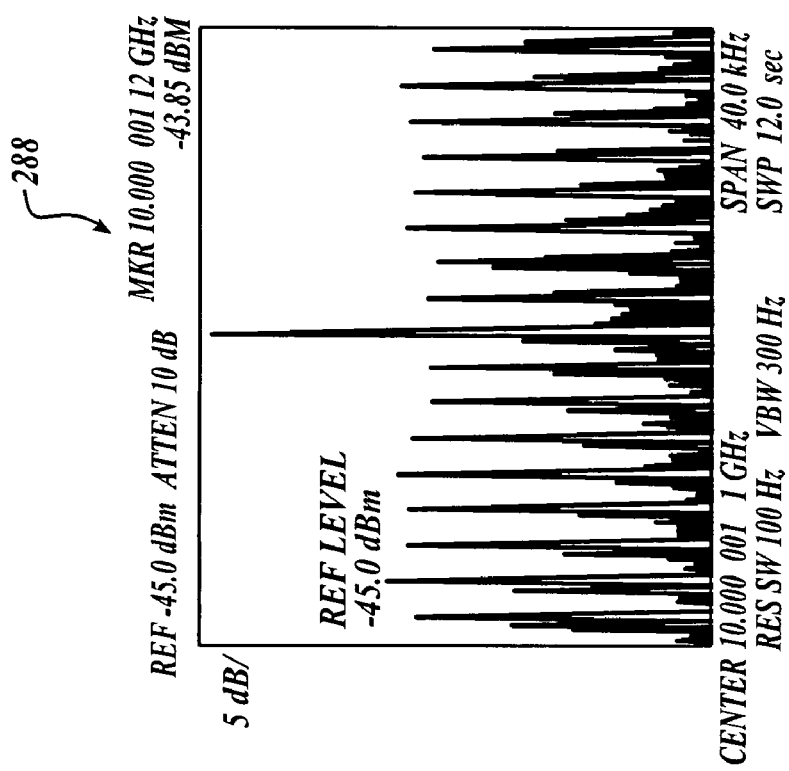
Figure 27A:
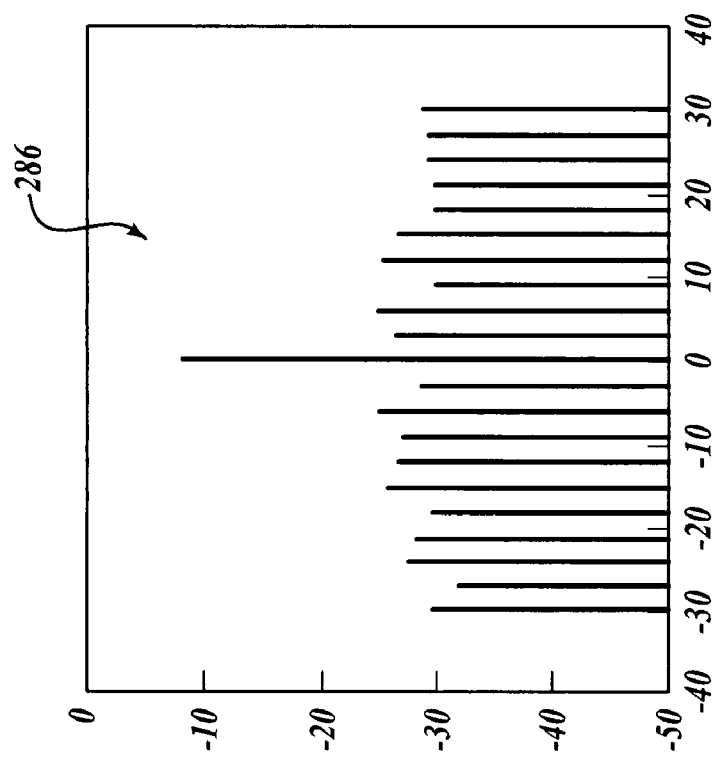
Figure 28B:
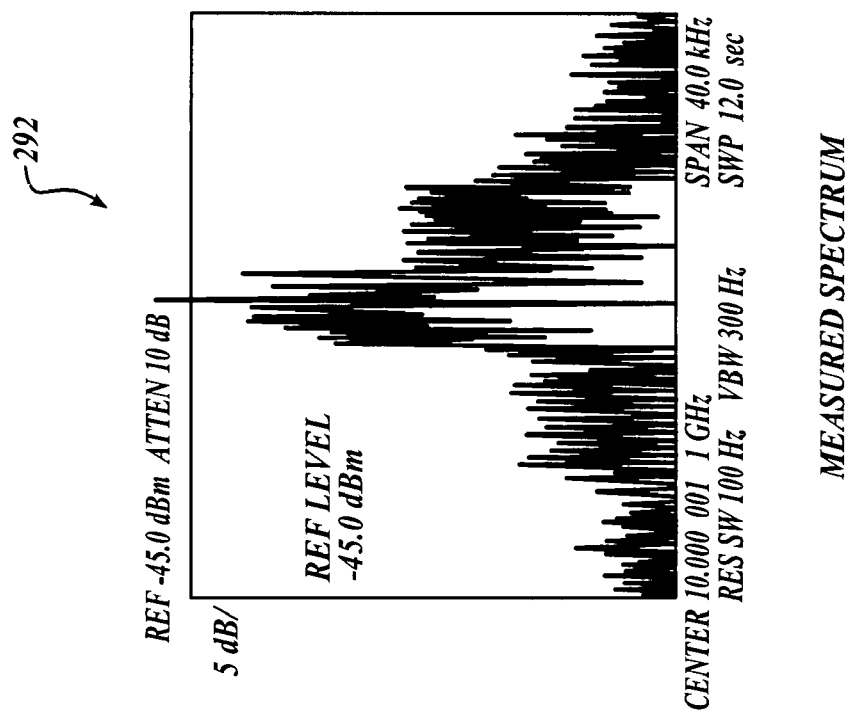
Figure 28A:
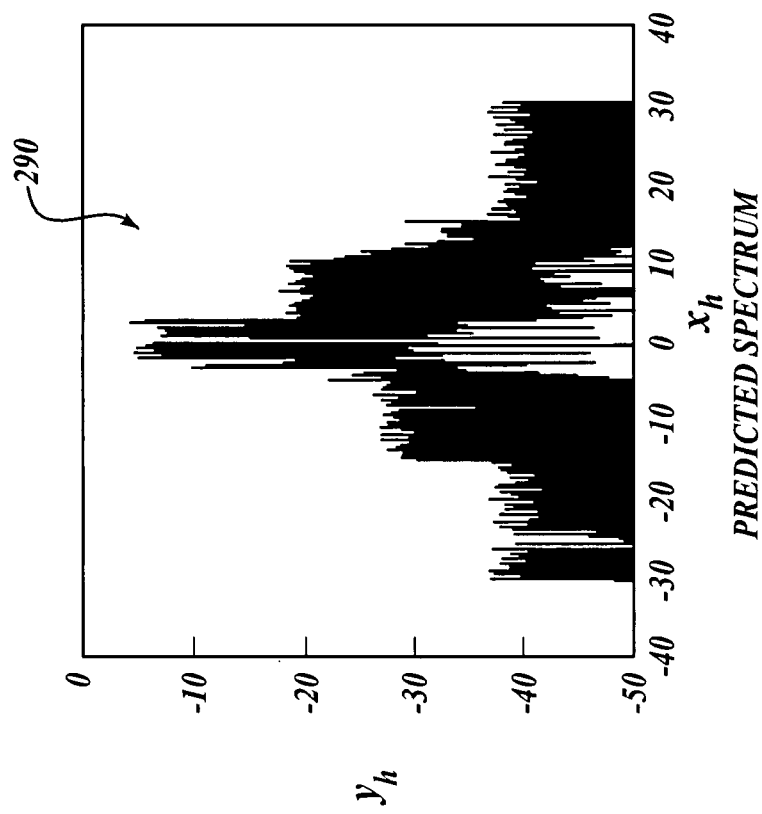

Furthermore, test data have shown that simulated platform JEMIPEM Doppler can be accurately replicated using embodiments of the present invention. For this test, two types of Doppler spectrum were desired to be replicated. Referring now to FIG. 27A, a graph 286 plots desired (or predicted) JEM Doppler spectrum for a platform to be simulated. Referring now to FIG. 27B, a scope trace 288 plots generated spectrum as measured on laboratory test equipment. Similarly, referring now to FIG. 28A, a graph 290 plots desired (or predicted) helicopter PEM Doppler spectrum for a helicopter platform to be simulated. Referring now to FIG. 28B, a scope trace 292 plots generated spectrum as measured on laboratory test equipment. Replication of the graphs 286 and 290 by the measured scope traces 288 and 292, respectively, validates JEM/PEM Doppler augmentation capabilities of the present invention.

Figure 29:
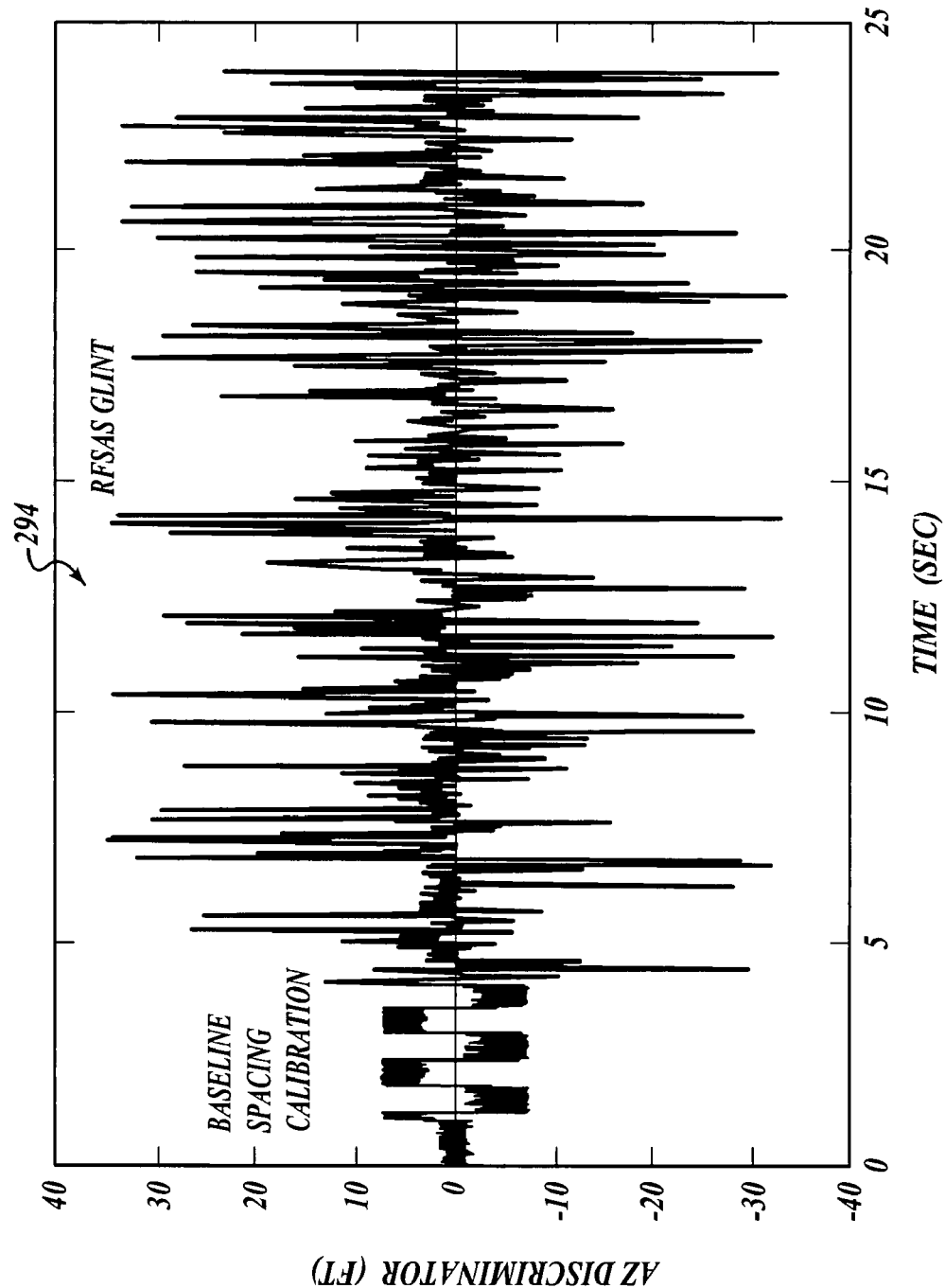

Referring now to FIG. 29, a graph 294 plots magnitude of glint (in feet) versus time (in seconds). The graph 294 was generated on a platform having a baseline spacing between the sources 52 of around ten feet. Several peaks occur at a magnitude of around +35 feet, and peaks at around 14 seconds and around 24 seconds occur at a magnitude of around −35 feet. That is, a host platform having an antenna baseline of around ten feet can generate glint having a magnitude of around seventy feet peak-to-peak using embodiments of the present invention. The baseline calibration is generated by alternately driving only one antenna of the pair used for glint simulation.

Figure 30:
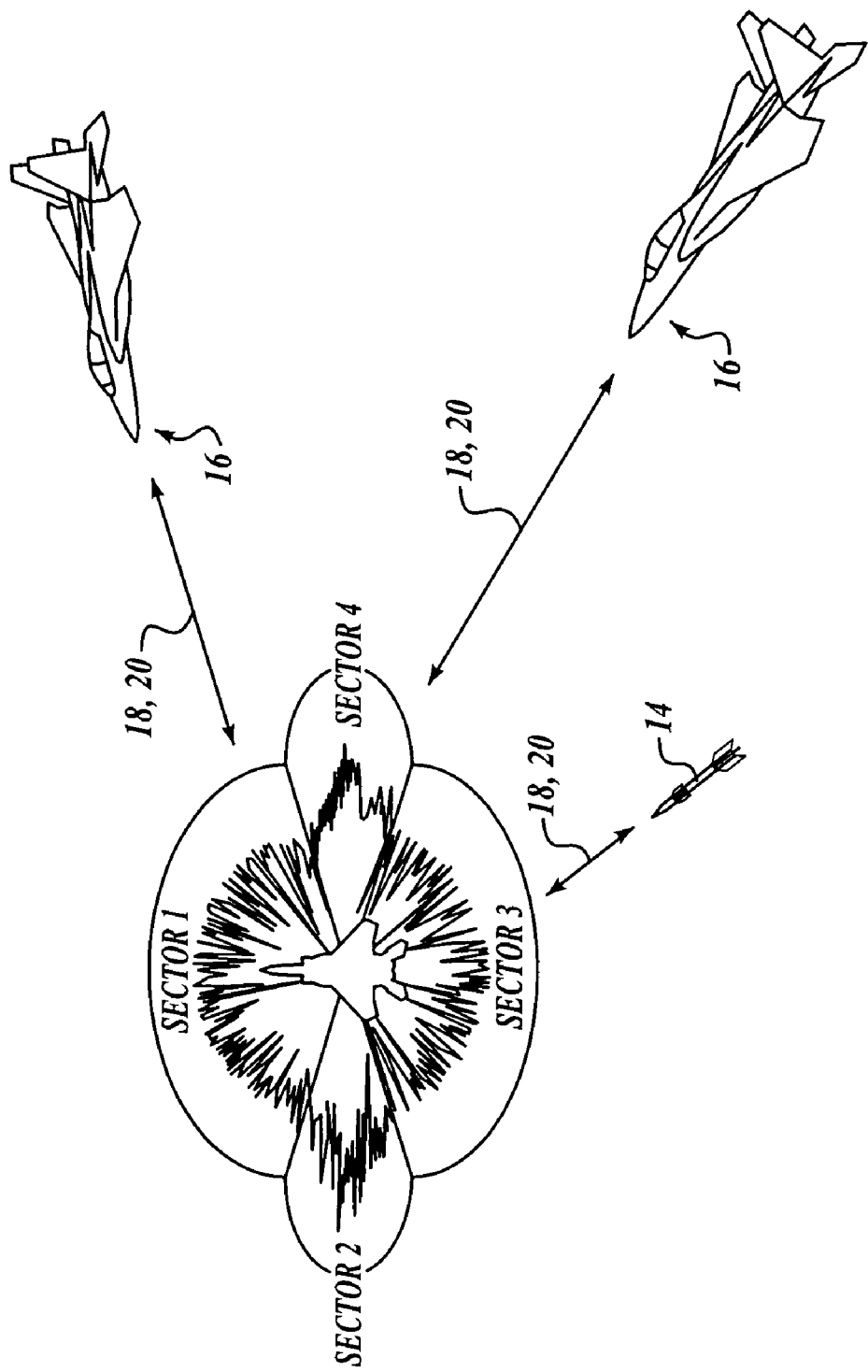
FIG. 30 illustrates a sector-based implementation according to an alternate embodiment of the present invention.

Referring now to FIG. 30, in an alternate embodiment of the present invention, aspect angle of the incoming radar signal 18 (that determines signature characteristics of the modulated radar signal 20) is determined by determining a sector from which the incoming radar signal originated (as opposed to determining AOA with azimuth angle and elevation angle). Independent RF channels are provided to process signals within each sector. The characteristics of each channel are fixed based on the target parameters seen from the look angle associated with each sector. Signal isolation between sectors is provided by the beam width of the sector antennas. At the transition between sectors the characteristics of two sectors will mix to present a gradual transition to each observer, such as the weapon system 14 or the radar system 16. This approach trades fixed SGU target modeling for more complex RF channelization. The sector approach is better suited to multiple threat engagements from all aspect angles.

The host platform 10 is not limited to subscale aircraft and the simulated platform 12 is not limited to full-sized aircraft. For example, the host platform 10 may be any one of without limitation a drone, an unmanned air vehicle (UAV), an unmanned air combat vehicle (UCAV), an unmanned fixed-wing aircraft, an unmanned rotary wing aircraft, manned aircraft, or a rocket. The simulated platform 12 may be without limitation any one of a full-sized fixed wing aircraft like a fighter aircraft, an attack aircraft or a bomber aircraft, or a rotary wing aircraft like a helicopter, or a full-sized rocket like a cruise missile or a theater ballistic missile. Furthermore, the host platform 10 may be a land vehicle, such as a car, truck, van, or the like, and the simulated platform 12 may be a land vehicle such as a tank, a troop transport, a large truck, a bus, a train, or the like. Moreover, the host platform may be a small marine craft such as a power boat, patrol craft, or the like, and the simulated platform may be a ship such as a naval surface ship, a merchant ship, a troop transport ship, a submarine, or the like.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for simulating a target, the method comprising:
   receiving an incoming radar signal transmitted from a radar source;
   modulating time of the received radar signal to generate first and second range extent signals;
   vector modulating the first range extent signal;
   dividing the second range extent signal into a plurality of divided second range extent signals;
   phase modulating a first of the plurality of divided second range extent signals;
   amplitude modulating a second of the plurality of divided second range extent signals; and
   transmitting the modulated signals.

2. The method of claim 1, wherein:
   the incoming radar signal is received at a first platform; and
   the transmitted signals simulate a plurality of signal facets that are indicative of a radar reflection from a second platform that is different than the first platform.

3. The method of claim 2, wherein:
   the incoming radar signal is received at an aspect angle; and
   the first and second range extent signals are modulated with a plurality of stored predetermined coefficients that are based on the aspect angle.

4. The method of claim 3, wherein the plurality of signal facets includes radar cross section, scintillation, glint, polarization, range extent, and range noise.

5. The method of claim 4, wherein:
   scintillation is simulated by modulating amplitude of the second of the plurality of divided second range extent signals;
   jet engine modulation is simulated by vector modulating the first range extent signal in phase and Doppler;
   radar cross section is simulated by amplifying the vector modulated first range extent signal;
   glint is simulated by phase modulation of the first of the plurality of the divided second range extent signals and is radiated from a plurality of antennas; and
   cross-polarization is simulated by transmitting a third of the plurality of the divided second range extent signals with polarization that is the same as polarization of the radar source and with polarization that is opposite the polarization of the radar source.

6. The method of claim 3, further comprising determining aspect angle of the incoming radar signal.

7. The method of claim 6, wherein determining the aspect angle includes one process chosen from:
   finding a direction from which the incoming radar signal originated; and
   processing a signal within a sector from which the incoming radar signal originated.

8. The method of claim 7, wherein finding the direction includes determining azimuth angle and elevation angle of the incoming radar signal.

9. The method of claim 2, further comprising inputting data regarding the signal facets that are indicative of the second platform.

10. A system for simulating a target, the system comprising:
    a radar receiver disposable on a first platform, the radar receiver being configured to receive at least one incoming radar signal transmitted from at least one radar source;
    a modulator including:
       a first modulator component configured to modulate time of the received radar signal to generate first and second range extent signals;
       a second modulator component configured to vector modulate the first range extent signal;
       a divider component configured to divide the second range extent signal into a plurality of divided second range extent signals;
       a third modulator component configured to phase modulate a first of the plurality of divided second range extent signals; and
       a fourth modulator component configured to amplitude modulate a second of the plurality of divided second range extent signals; and
    a radar transmitter configured to transmit the modulated signals.

11. The system of claim 10, wherein:
    the incoming radar signal is received at an aspect angle; and
    the modulator is further configured to modulate the first and second range extent signals with a plurality of stored predetermined coefficients that are based on the aspect angle.

12. The system of claim 10, wherein the transmitted signal simulates a plurality of signal facets including radar cross section, scintillation, glint, range extent, and range noise.

13. The system of claim 12, wherein:
    scintillation is simulated by modulating amplitude of the second of the plurality of divided second range extent signals;
    jet engine modulation is simulated by vector modulating the first range extent signal in phase and Doppler;
    radar cross section is simulated by amplifying the vector modulated first range extent signal;
    glint is simulated by phase modulation of the first of the plurality of the divided second range extent signals and is radiated from a plurality of antennas; and
    cross-polarization is simulated by transmitting a third of the plurality of the divided second range extent signals with polarization that is the same as polarization of the radar source and with polarization that is opposite the polarization of the radar source.

14. The system of claim 10, wherein the radar receiver includes a first component configured to determine aspect angle of the incoming radar signal.

15. The system of claim 14, wherein the first component includes one unit chosen from:
    a direction finding unit configured to find a direction from which the incoming radar signal originated; and a sector determining unit configured to process a signal within a sector from which the incoming radar signal originated.

16. The system of claim 15, wherein the direction finding unit is further configured to determine azimuth angle and elevation angle of the incoming radar signal.

17. The system of claim 12, further comprising:
an input interface configured to input data regarding the signal facets that are indicative of the second platform; and
memory configured to store the data.

18. A vehicle comprising:
a first vehicle platform; and
a system for simulating a target having a second vehicle platform that is different from the first vehicle platform, the system including:
a radar receiver configured to receive at least one incoming radar signal transmitted from at least one radar source;
a modulator including:
a first modulator component configured to modulate time of the received radar signal to generate first and second range extent signals;
a second modulator component configured to vector modulate the first range extent signal;
a divider component configured to divide the second range extent signal into a plurality of divided second range extent signals;
a third modulator component configured to phase modulate a first of the plurality of divided second range extent signals; and
a fourth modulator component configured to amplitude modulate a second of the plurality of divided second range extent signals; and
a radar transmitter configured to transmit the modulated signals.

19. The vehicle of claim 18, wherein the vehicle includes one vehicle chosen from an aircraft, a land vehicle, and a marine vessel.

20. The vehicle of claim 19, wherein:
the first vehicle platform includes one of vehicle platform chosen from a manned air vehicle, an unmanned air vehicle, a fixed wing air vehicle, a rotary wing air vehicle, a drone aircraft, and a rocket; and
the second vehicle platform includes one of vehicle platform chosen from a fighter aircraft, an attack aircraft, a bomber aircraft, a helicopter, and a ballistic missile.

* * * * *